(12) United States Patent
Morimoto

(10) Patent No.: US 6,317,735 B1
(45) Date of Patent: Nov. 13, 2001

(54) METHOD AND APPARATUS FOR DETERMINING RULE IN DATABASE

(75) Inventor: Yasuhiko Morimoto, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/322,215

(22) Filed: May 28, 1999

(30) Foreign Application Priority Data

May 29, 1998 (JP) .................................................. 10-149790

(51) Int. Cl.⁷ ............................... G06F 17/30; G06F 7/00
(52) U.S. Cl. .................................................................. 707/2
(58) Field of Search .............................................. 707/2, 1

(56) References Cited

U.S. PATENT DOCUMENTS 5,365,426 * 11/1994 Siegal et al. ................... 364/413.06
5,842,200 * 11/1998 Agrawal et al. ........................ 707/1
6,185,549 * 2/2001 Rastogi et al. ........................ 706/45

* cited by examiner

Primary Examiner—Jack Choules
Assistant Examiner—Susan Rayyan
(74) Attorney, Agent, or Firm—Marc D. McSwain

(57) ABSTRACT

When determining a rule associated with an objective attribute of data in a database to predict the objective attribute value of data, following steps are performed: storing values relative to data belonging to each bucket wherein the values correspond to each bucket in a plane, and the plane has two axes respectively corresponding to two predicative numeric attributes of data and is divided into N×M buckets; segmenting a bucket region that is satisfied with a predetermined condition, from the plane; performing a smoothing processing for a boundary of the segmented bucket region; and determining a rule for predicting the object attribute value of the data by the smoothed region.

19 Claims, 27 Drawing Sheets

RECTILINEAR CONVEX REGION

NOT RECTILINEAR CONVEX REGION

```
for k=0 to N_y-1 do
    for s=0 to N_y-1-k do
        t=s+k
        CALCULATE f_m^W(s,t) USING EXPRESSION 22
    end
end
```

```
for t:=0 to N_y-1 do
    β^W=0
    β^U=0
    for s:=0 to t do
        if f_{m-1}^W(s,t) > f_{m-1}^W(β^W,t) then β^W=s
        if f_{m-1}^U(s,t) > f_{m-1}^U(β^U,t) then β^U=s
        β_{m-1}^W(s,t)= β^W
        β_{m-1}^U(s,t)= β^U
    end
end
```

```
for s=0 to N_y-1 do
    for t=s to N_y-1 do
        CALCULATE f^U_m(s,t) USING EXPRESSION 25
    end
end
```

```
for t=N_y-1 to 0 do
    for s=t to 0 do
        CALCULATE f^D_m(s,t) USING EXPRESSION 28
    end
end
```

```
for s:=N_y-1 to 0 do
        τ^W=N_y-1
        τ^D=N_y-1
    for t:=N_y-1 to s do
            if f^W_{m-1}(s,t) > f^W_{m-1}(s, τ^W) then τ^W=t
            if f^D_{m-1}(s,t) > f^D_{m-1}(s, τ^D) then τ^D=t
            τ^W_{m-1}(s,t)= τ^W
            τ^D_{m-1}(s,t)= τ^D
    end
end
```

```
for k=N_y-1 to 0 do
    for t=N_y-1 to k do
        s=t-k
        CALCULATE f_m^N(s,t) USING EXPRESSION 29
    end
end
```

| 31,30 | 29, ... ,0 |
|---|---|
| CHANGE TENDENCY Y | SECTION [u,v] |

FIG. 40

METHOD AND APPARATUS FOR DETERMINING RULE IN DATABASE

TECHNICAL FIELD

The present invention relates to a prediction of an objective numeric attribute value of data in a database, more particularly to a prediction of an objective numeric attribute value of data in a database, using a decision tree or a regression tree. The decision tree is a tree constituted for predicting whether a true-false attribute value of data is true or false, and the regression tree is a tree constituted for predicting a numeric attribute value of data.

BACKGROUND

Japanese Published Unexamined Patent Application No. 09-179883 discloses a method comprising the steps of: preparing a plane having two axes corresponding to two predicative numeric attributes of data in a database and divided into a plurality of rectangular buckets; storing the number of data included in each of the buckets so as to correspond to the bucket, as well as the number of data included in each of the buckets, whose true-false attribute value is true; segmenting a bucket region which is convex to one axis on the plane from the plane according to predetermined conditions, and deriving an association rule among the data using the segmented region. The object of this gazette is to derive the association rule among the data in the database. Since the region is constituted by a group of buckets connected to each other, the region is squarish in shape. A paper (paper 1: "Computing Optimized Rectilinear Regions for Association Rules," K. YODA, T. FUKUDA, Y. MORIMOTO, S.MORISHITA, and T. TOKUYAMA, in KDD-97 Proceedings Third International Conference on Knowledge Discovery and Data Mining, pp. 96–103, The AAAI Press, ISBN 0-1-57735-027-8) discloses a method for segmenting a region in a rectilinear convex, which comprises rectangular buckets, from a plane according to predetermined conditions unlike the above mentioned gazette. Also in this paper, it is intended to derive an association rule among data in a database. Since the region is defined by a group of rectangular buckets connected to each other, the region is squarish in shape.

Moreover, a paper (paper 2: "Efficient Construction of Regression Trees with Range and Region Splitting," Y. MORIMOTO, H. ISHII and S. MORISHITA, in Proceeding of the Twenty-third International Conference on Very Large Data Bases, pp 166–175, August 1997) discloses a method in a regression tree which comprises the steps of: preparing a plane having two axes corresponding to two predicative numeric attribute of data in a database and divided into a plurality of rectangular buckets; storing the number of data included in each of the buckets and a sum of an objective numeric attribute value of data so as to correspond to each bucket; segmenting a bucket region which minimizes the mean-squared error of the objective numeric attribute value from the plane; and generating a node concerning the data included in the segmented region and a node concerning data outside the region. The regression tree itself can be used for predicting a numeric attribute value in unknown data. However, since the bucket region which minimizes the mean-squared error of the objective numeric attribute value is the one which is convex to one axis on the plane or is rectilinear convex and is defined by a group of rectangular buckets connected to each other, the region is squarish in shape.

OBJECTS OF THE INVENTION

In the background art described above, owing to properties of region segmentation algorithm, the segmented region is squarish in shape since it is a gathering of the rectangular buckets. However, in spite of the fact that the two numeric attribute values corresponding to the two axes on the plane are continuous and the two corresponding numeric attribute values of the data to be predicted are given as continuous values, the region is segmented in a unit of rectangular buckets, it is unclear whether the boundary line of that region possesses a reliability enough to perform a prediction or not. For this reason, prediction results may differ occasionally. Moreover, in the decision tree or the regression tree, since the number of data included in the node reduces as the tree grows, the size of a rectangular bucket becomes larger. Therefore, the segmented region becomes irregular in shape. Also in this case, appropriateness of the boundary line of the region is questionable. However, it is impossible to directly segment from the foregoing plane the region defined by a smooth curve because of the large volume of computation.

From the point of view described above, the object of the present. invention is to segment a region defined by a smooth boundary line from a plane mapped by two axes corresponding to two predicative attributes of data, and to utilize the region for prediction of an objective attribute of data.

Another object of the present invention is to constitute a node of a decision tree or a regression tree using the segmented region.

Still another object of the present invention is to enhance the accuracy of the prediction.

SUMMARY OF THE INVENTION

The present invention is a method for determining a rule associated with an objective attribute of data in a database to predict the objective attribute value of data, comprising the steps of: storing values relative to data belonging to each bucket wherein the values correspond to each bucket in a plane, and the plane has two axes respectively corresponding to two predicative numeric attributes of data and is divided into N×M buckets; segmenting a bucket region that is satisfied with a predetermined condition, from the plane; performing a smoothing processing for a boundary of the segmented bucket region; and determining a rule for predicting the object attribute value of the data by the smoothed region. As a result, by the smoothed bucket region, an objective attribute value can be predicted. The values relative to data belonging to a bucket, which are described above, may be the number of data belonging to each bucket and values relative to the objective attribute of data belonging to a bucket.

If the objective attribute is a numeric attribute (in case of a regression tree), the value relative to said objective attribute may be the sum of values of said objective attribute of data belonging to a bucket. If the objective attribute is a true-false attribute (in case of a decision tree), the value relative to said objective attribute may be the number of data whose objective attribute value is true and belongs to a bucket.

The predetermined condition in the segmenting step may be (a) to minimize the mean squared error of the objective attribute value (or to maximize an interclass variance), (b) to maximize an entropy gain of discrete values of the objective attribute, (c) to maximize a GINI index function value of discrete values of the objective attribute, (d) to maximize a $\chi$ square value of discrete values of the objective attribute, (e) if the objective attribute value is a true-false attribute, to maximize the number of included data when a ratio of data whose objective attribute value is true is more than a predetermined value, or (f) to maximize a ratio of data whose objective attribute value is true when the minimum number of included data is defined. It is better to use the condition (a) in the regression tree.

The smoothing processing described above may be a processing to make a boundary of said region a spline curve. In addition, the smoothing processing may comprise a step of defining control points in sides of N stripes in the region, wherein the stripes are parallel to an axis corresponding to a first predicative numeric attribute, and the sides are parallel to an axis corresponding to a second predicative numeric attribute. At this time, the smoothing processing may further comprise a step of setting a curve passing the control points (for example, see FIG. 11), or a step of setting a curve passing middle points of a line between adjacent control points (for example, see FIG. 12). By making the boundary of the region the spline curve, the accuracy of the prediction is improved.

In addition, the determining step may comprise a step of generating a tree in which a node relative to data within the smoothed region and a node relative to data outside of the smoothed region are added. In case of the regression tree or the decision tree, such a process makes a tree. The present invention, however, can be applied to a case in which only one node exists.

The processing flow of the present invention is described above, however, it is also possible to implement the present invention as a program for causing a computer to perform these processing or as an apparatus for performing these processing. This program can be stored into a storage medium such as a floppy disk or CD-ROM etc., and into other storage device by a person skilled in the art.

BRIEF DESCRIPTION OF THE DRAWINGS

FIG. 40 is a data structure for $H^X(m, [s,t])$;

DESCRIPTION OF THE PREFERRED EMBODIMENTS

Figure 1:
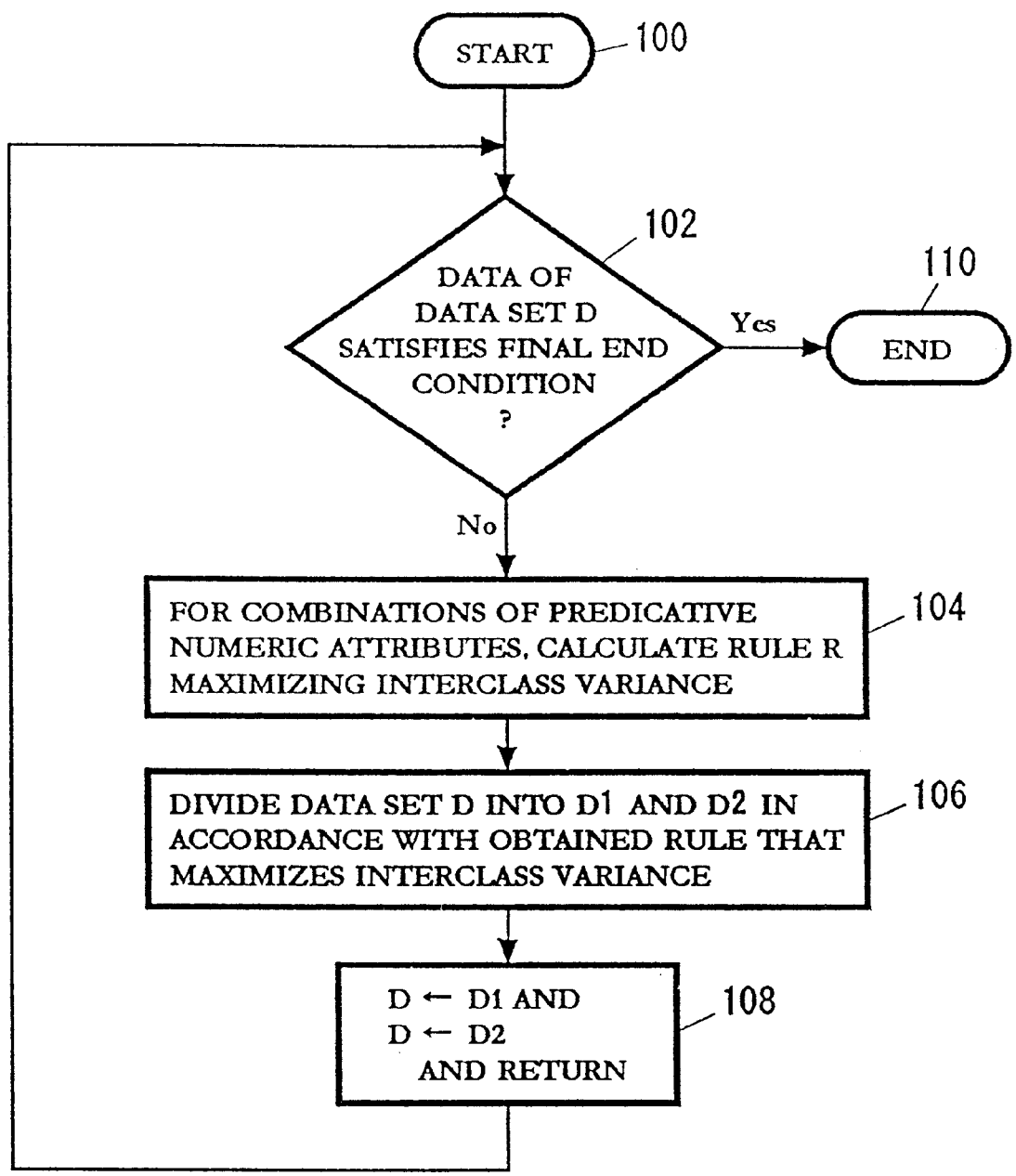
FIG. 1 is a high level flowchart for constructing a regression tree.
Figure 2:
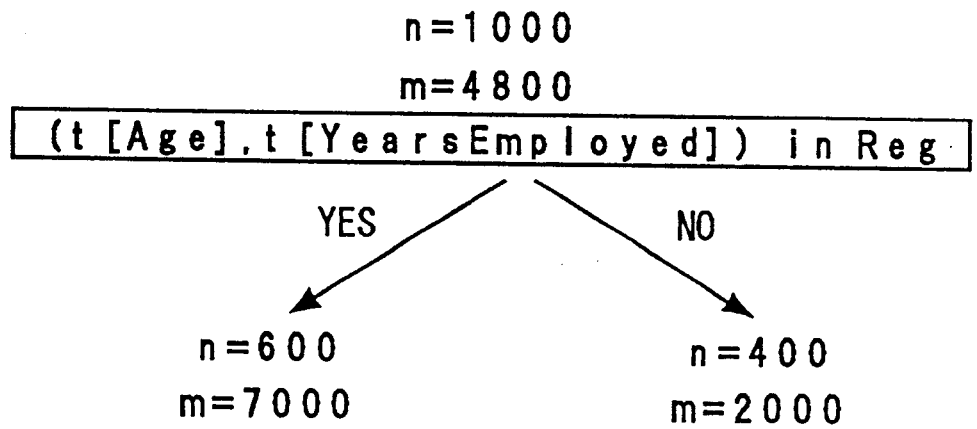
FIG. 2 is a diagram showing an example regression tree.
Figure 3:
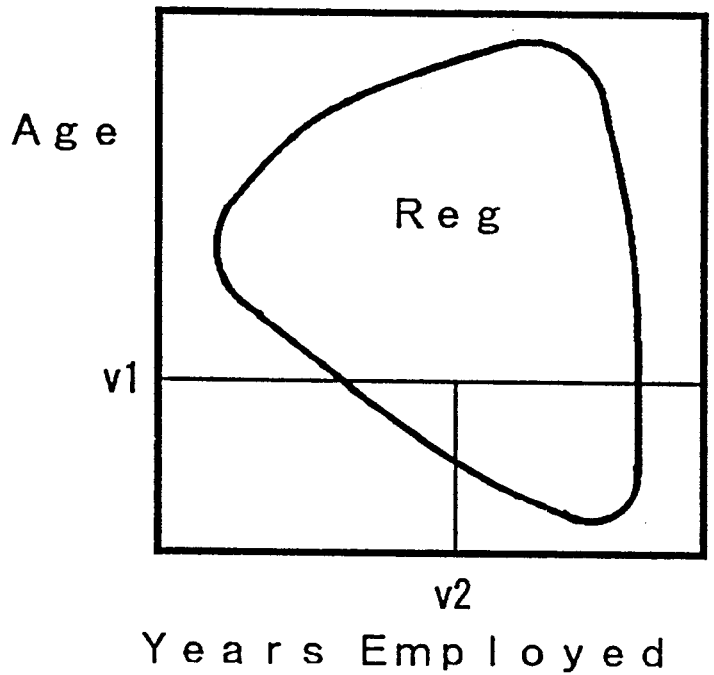
FIG. 3 is a diagram showing an example rule for splitting when two numeric attributes are handled.

An outline of a processing flow for constructing a regression tree is illustrated in FIG. 1. For example, the regression tree is illustrated in FIG. 2, "Reg" is a region shown in FIG. 3. "Age" is an age, "Years Employed" is the number of years employed, "n" is the number of data, and "m" is the salary. This is an example for constructing a tree so that a mean squared error of an average value of the salary is made minimum. First, it is checked whether data in data set D satisfies the terminal condition (step 102). If the data set D is a set of initial data it will not satisfy the terminal condition, then program control moves to the next step. When the data set D is a result obtained by performing multiple iterations of the processing that will be described later, data set D may satisfy the terminal condition determined by the user. At that time, the processing is terminated (step 110).

Next, the rule R for maximizing the interclass variance (more generally the rule R which satisfies a predetermined condition is computed for a combination of predicative numeric attributes (step 104). When the regression tree is constructed, splitting rules most suitable for minimizing the mean squared error must be computed. However, as described in the paper 2, to minimize the mean squared error is equivalent to maximize the interclass variance, and from the viewpoint of a computation cost, it is intended to find out the region which maximizes the interclass variance. If there is no particular problem, the rule is computed for all of the combinations. Originally, in this process, since the object is the construction of the splitting rule R from two numeric attributes, an execution for the combinations of the predicative numeric attributes shall be done. However, in some cases, using the splitting rule R for the one predicative attribute, it may be possible to split the data set. This is possible if a predicative attribute has a small correlation with other attributes. At step 104, therefore, the rule may be obtained from such a single predicative attribute.

The data set D is divided into subsets D1 and D2 according to the rule whose interclass variance is maximum among all of the derived rules, (more generally, the rule concerning the most suitable combination of the predicative numeric attributes, which satisfies the predetermined condition) (step 106). As described at step 104, if the interclass variance (more generally, the predetermined condition) is computed for a rule obtained for a single predicative attribute, the comparison can be executed at step 106. Then, the foregoing step will be executed after substituting the data set D for the subsets D1 and D2. (step 108).

Because the processing for a single predicative attribute is executed in the same manner as that of the prior art, an explanation will be made for a method for constructing the rule R for maximizing an interclass variance concerning two predicative numeric attributes. The outline of the processing will now be described with reference to FIG. 4. First, a plane mapped by two predicative numeric attributes is constituted, and this plane is meshed (step 122, see FIG. 5). The individual mesh elements store the number of tuples in data set D that belong to the mesh element and the sum of the objective numeric attribute values of tuples that belong to the mesh element. When an objective attribute is a true-false attribute, as described later, the number of tuples whose objective attribute value is true is stored. An arbitrary method for constituting the meshed plane shown in FIG. 5 may be employed. As an example, a method may be employed for sampling an appropriate number of data from the data set D, and sorting the sampled data for every numeric attribute, by using the sorted results, determining the boundary value of the mesh elements, and classifying all of the data to each mesh element. Moreover, it is possible to sort all of the data, and to determine the boundary values of the mesh elements using the sorting results for the data. Furthermore, it is also possible to determine the boundary values of the mesh elements, first, and to classify all of the data depending on the boundary values. The mesh elements are called buckets.

The shape of the region to be segmented from the plane is designated (step 124). This step may be executed first. The shape of the extracted region R is x monotone, rectilinear convex or base monotone. This will be described later. Noted that the region R can also have another shape. Finally, a probing parameter e is changed and the region R for maximizing the interclass variance, (more generally, the region R that satisfies predetermined conditions) is segmented from the plane (step 126). This region R is defined as a splitting rule R.

A method for segmenting this region is performed by a method called as a hand probe. According to this method, when, in a plane (FIG. 6) where a tuple count x(R) in the region R and a sum y(R) of values of the objective numeric attribute of the tuples in the region R are employed as coordinates, a point set composed of (x(R), y(R)) relative to all of the region group R is denoted by P (white and black dots in FIG. 6) and the convex hull of P is denoted by conv(P) (black dot of FIG. 6), the dots on the convex hull conv(P) are computed rapidly by the hand probe. When the objective attribute is a true-false attribute, as described later, the sum of values of the objective numeric attribute of the tuples must be replaced with the number of tuples whose objective attribute value is true. The hand probing is a method for acquiring the convex hull by a touching oracle, i.e. "in assuming a linear line, $y = \theta x + A$, having a slope $\theta$, by maximizing (or minimizing) Y-intercept A so that the linear line contacts the convex hull conv(P), and by acquiring the contact point on the convex hull." Here, the probing parameter $\theta$ means the slope $\theta$.

Figure 5:
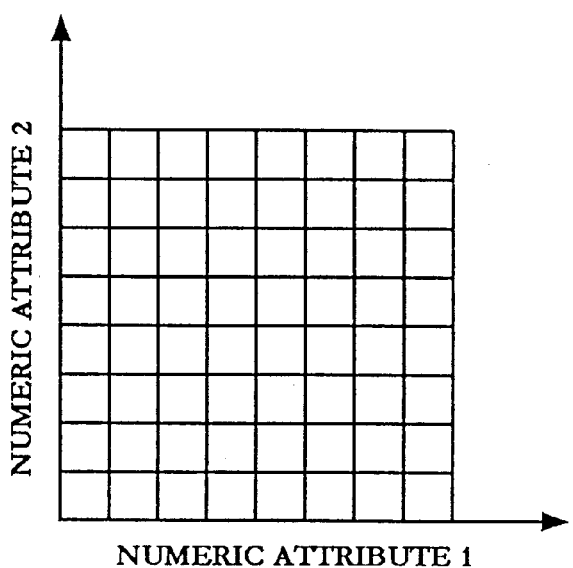
FIG. 5 is a diagram showing a plane that is formed by two numeric attributes.
Figure 6:
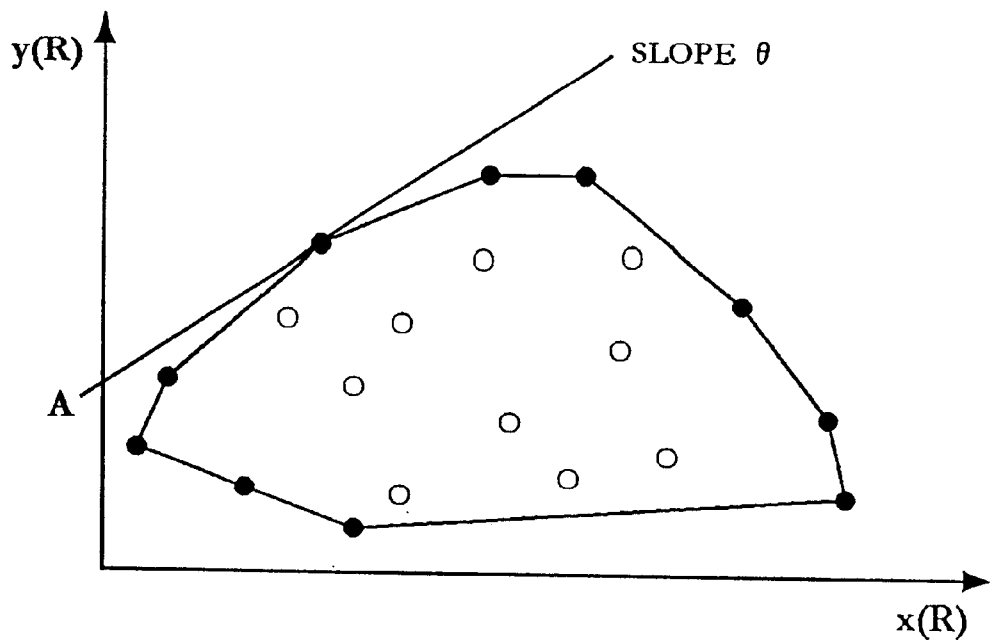
FIG. 6 is a graph showing an x(R), y(R) plane.

A point which maximizes the interclass variance exists on the convex hull conv(P) on the plane shown in FIG. 6. The interclass variance V(R) of a splitting rule R is computed as follows:

$$V(R) = |D^{true}|(\mu(D^{true}) - \mu(D))^2 + |D^{false}|(\mu(D^{false}) - \mu(D))^2$$

where for the data set D, $D^{true}$ is a data set which satisfies the rule, $D^{false}$ is a data set which does not satisfy the rule, |D| is the number of data in the data set D, and $\mu(D)$ is an average of the objective numeric attribute in the data set D. This interclass variance V(R) is modified as the expression 1:

$$V(R) = V(x(R), y(R)) \qquad \text{[Expression 1]}$$
$$= x(R)\left(\frac{y(G)}{N} - \frac{y(R)}{x(R)}\right)^2 +$$
$$(N - x(R))\left(\frac{y(G)}{N} - \frac{y(G) - y(R)}{N - x(R)}\right)^2$$

where N is the number of all the data on the meshed plane G in FIG. 5, and y(G) is the sum of the values of the objective numeric attribute of all of the data.

Assuming that x(R)=x and y(R)=y and, for convenience sake, the average of the objective numeric attribute values of all of the data on the plane G is y(G)/N=0, then y(G)=0 when N≠0 and interclass variance function V(x,y)=f(x,y) is expressed as follows:

$$V(x, y) = f(x, y) = y^2 \left( \frac{1}{x} + \frac{1}{N-x} \right) \quad \text{[Expression 2]}$$

Then, the following fact is derived from the convex function property of the interclass variance function.

Figure 7:
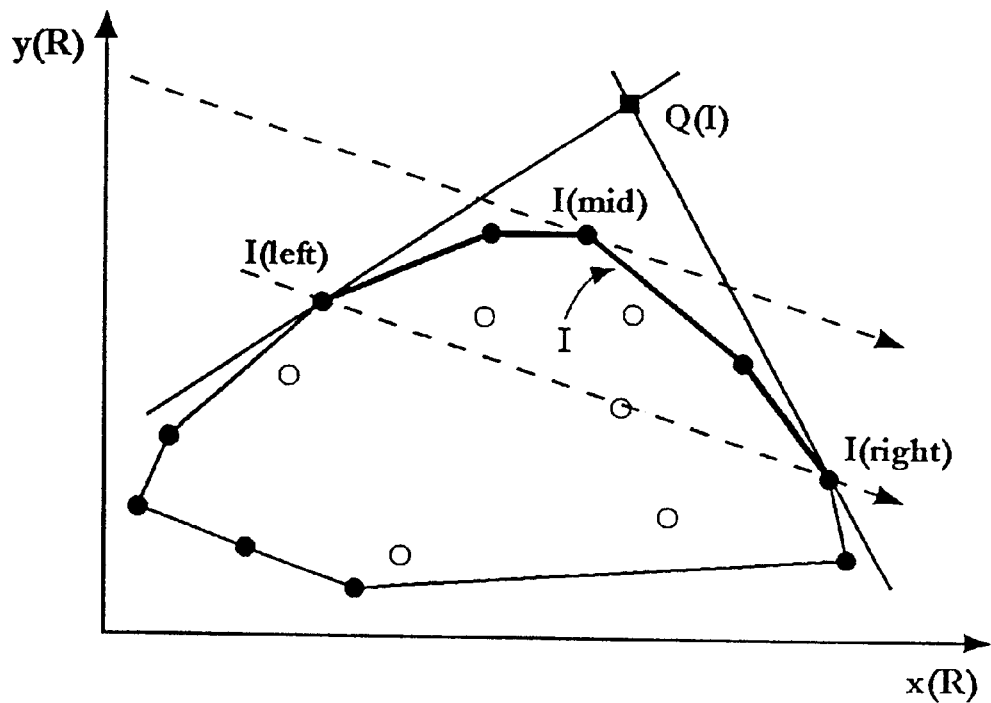
FIG. 7 is a graph for explaining the method for rapidly acquiring points on a convex hull in the plane of FIG. 6.

Here, let two vertexes (contact points) obtained by probing with two probing parameter values be l(left) and l(right), respectively (FIG. 7). When the value of the interclass variance at the intersection Q(I) of the two tangent lines which were utilized for acquiring the two vertexes is not larger than the current maximum value of the interclass variance found during the search, any splitting corresponding to a vertex between the two vertexes l(left) and l(right) on the convex hull gives no maximum interclass variance. Specifically, the value of the interclass variance of Q(I) is larger than the values of the interclass variances at all points on the convex hull disposed between l(left) and l(right), and is called as an upper bound. When Q(I) is not larger than the current maximum value of the interclass variance found, it is unnecessary to search for vertexes between l(left) and l(right).

From the convex property of the interclass variance function, a point on the convex hull having maximum value of the interclass variance can be found in the plane shown in FIGS. 6 and 7, efficiently. In order to find the point on the convex hull having the maximum value of the interclass variance, an example method for setting θ will be described using FIGS. 8 to 10.

Figure 8:
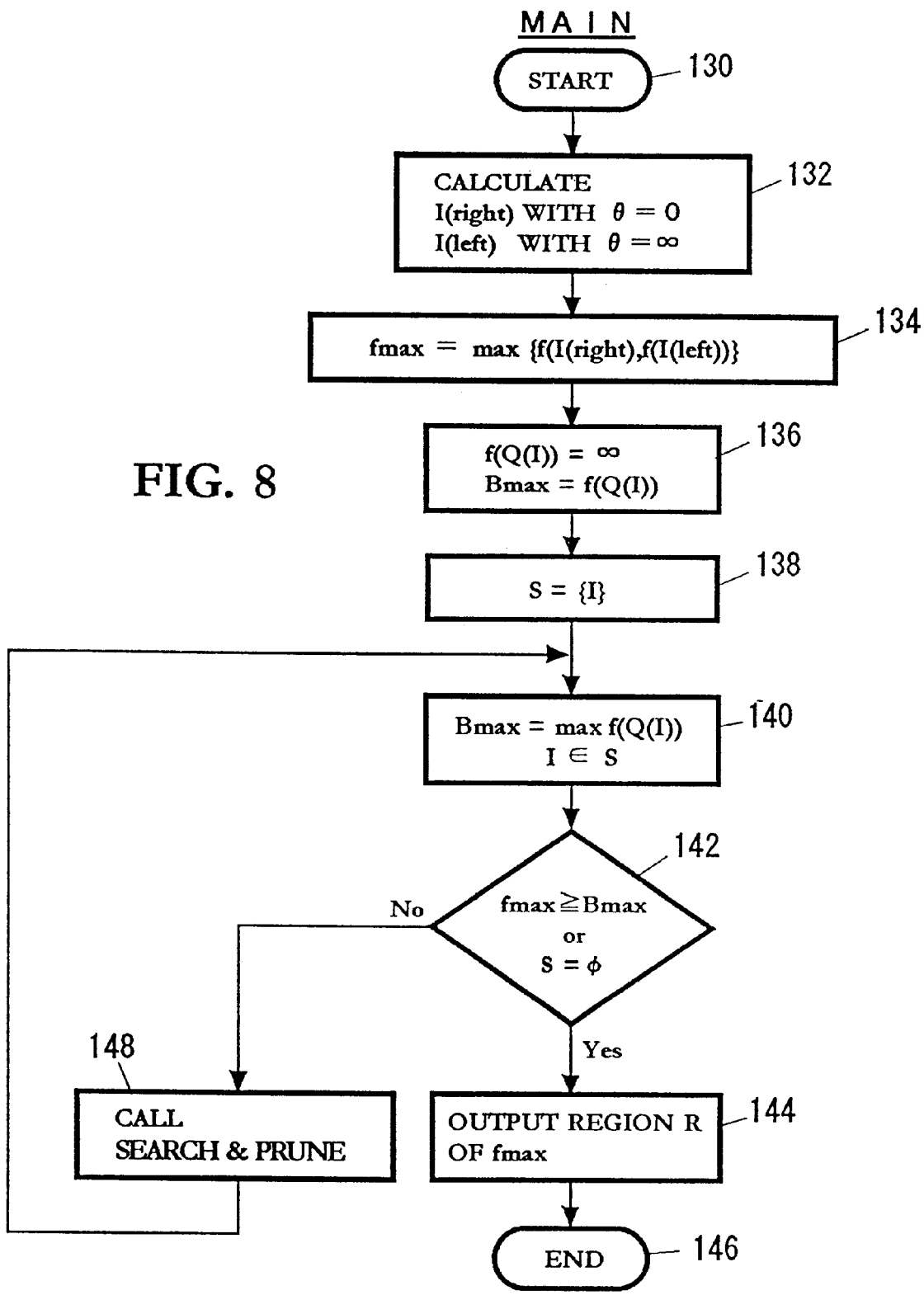
FIG. 8 is a flowchart for an example method for rapidly acquiring points on the convex hull in the plane of FIG. 6.

FIG. 8 is a main (MAIN) flowchart. First, I(right) is calculated with θ=0 (horizontal), and I(left) is calculated with θ=∞ (vertical) (step 132). Coordinate (x, y) of I(right) in FIG. 8 is input to the interclass variance function f(x, y) (a modification of Expression 11), and the result is defined as f(I(right)). Similarly, f(I(left)) is defined for I(left). The larger of the two interclass variance values is input to $f_{max}$ (step 134). Interclass variance value f(Q(I)) at upper bound Q(I) for I(right) and I(left) is defined as ∞, and f(Q(I)) is input to a variable $B_{max}$ (step 136). The interval between I(right) and I(left) is defined as I, which is input to set S for the interval (step 138).

The maximum value of the interclass variance value f(Q(I)) for upper bound Q(I) of I included in the set S for the interval is input to the variable $B_{max}$ (step 140). At the first iteration, I is only one and f(Q(I))=∞ and this value is again input to the variable $B_{max}$. Then, a check is performed to determine whether or not $f_{max} \geq B_{max}$ or S is an empty set (step 142), that are the iteration end condition. The first condition $f_{max} \geq B_{max}$ means that there is no maximum value $B_{max}$ of the interclass variance value for the upper bound, that is greater than maximum interclass variance value $f_{max}$ at a point on the convex hull that has been obtained. If this condition is established, it is assumed that region R including $f_{max}$ is the objective rule R, and this region R is output (step 144). If the end condition is not established, a SEARCH&PRUNE process is called (step 148).

Figure 9:
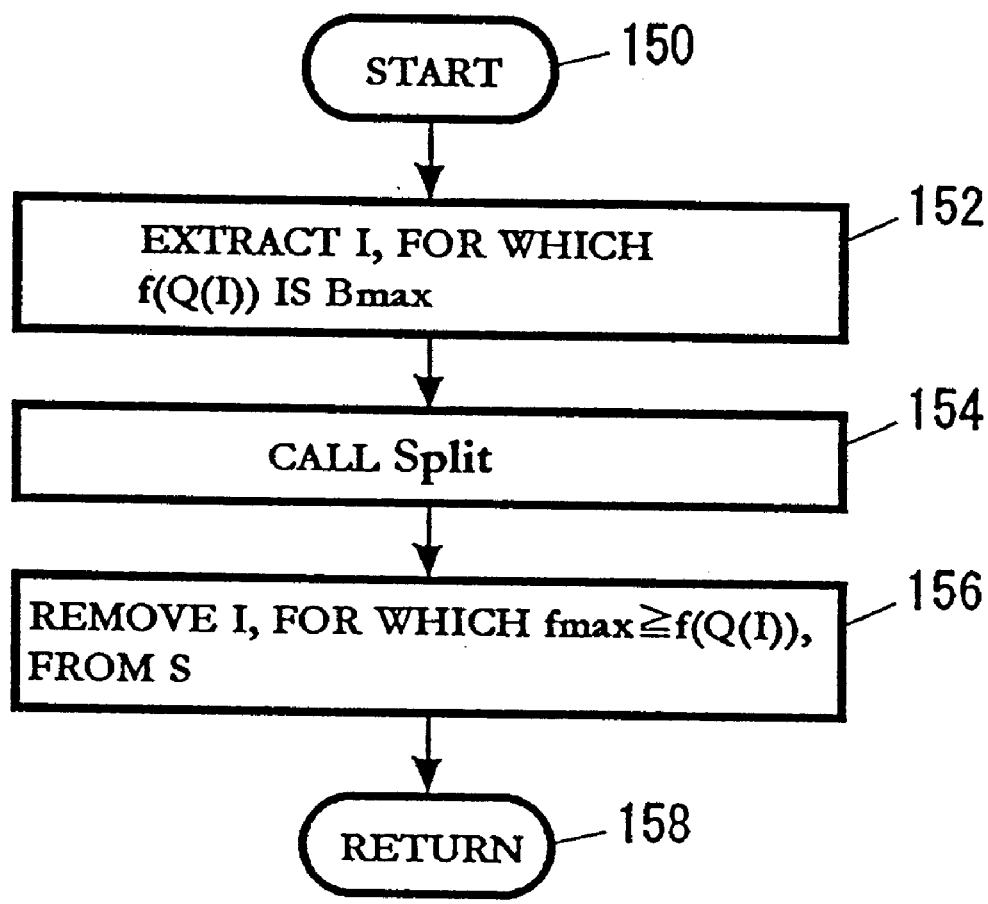
FIG. 9 is a flowchart for the example method for rapidly acquiring points on the convex hull in the plane of FIG. 6.

The SEARCH&PRUNE process is shown in FIG. 9. In this process, first, I, for which f(Q(I)) is $B_{max}$, is extracted and is processed (step 152). At the first iteration, the interval I between I(right) and I(left) is extracted unchanged. Then, the Split process is called (step 154). This process for dividing the interval I will be described later referring to FIG. 10. When the Split process has been completed, interval I, wherein $f_{max} \geq f(Q(I))$ is established, is removed from intervals included in set S (step 158). This is done because no point to be obtained exists in the interval I on the convex hull if the interclass variance f(Q(I)) for the upper bound of the interval I is not greater than $f_{max}$.

Figure 10:
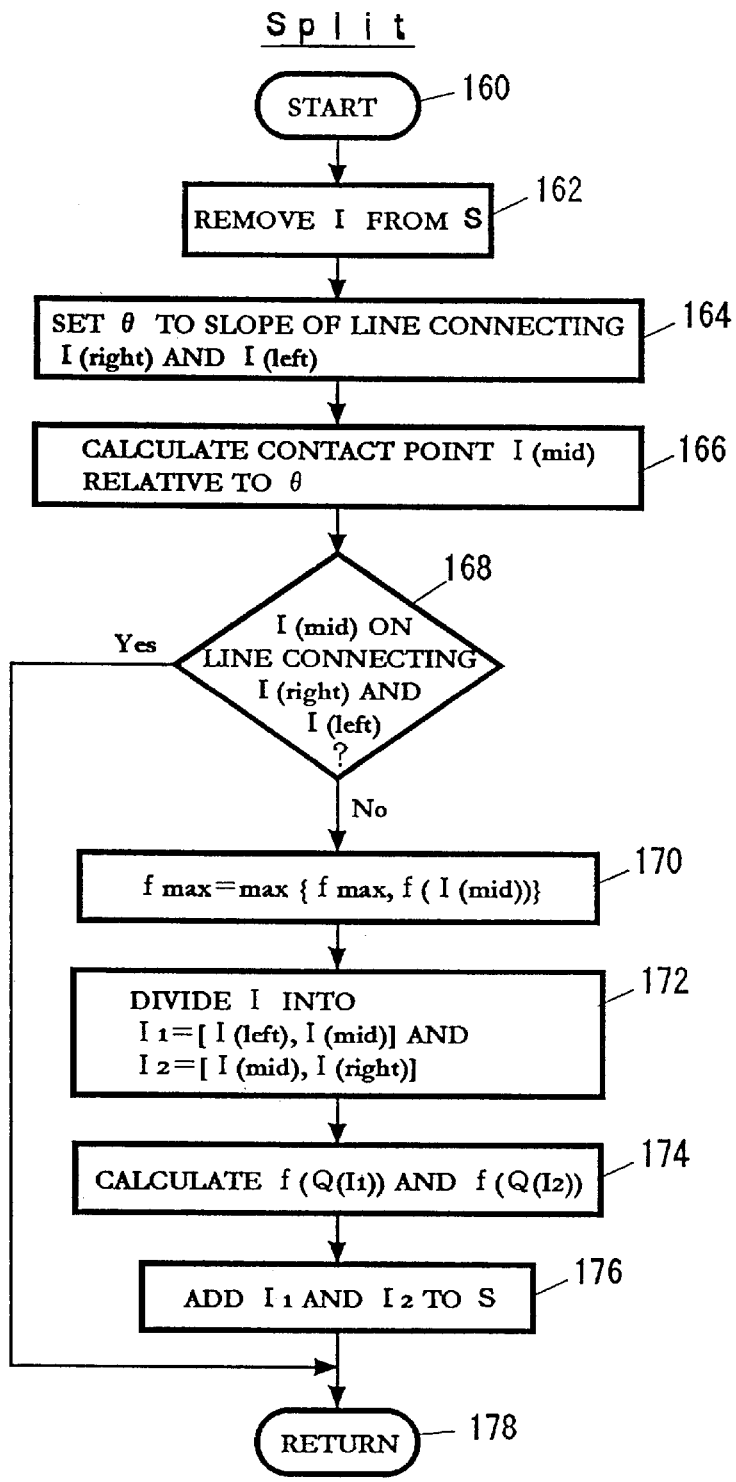
FIG. 10 is a flowchart for the example method for rapidly acquiring points on the convex hull in the plane of FIG. 6.

The Split process will now be described referring to FIG. 10. To split specific interval I, that interval I is removed from interval set S (step 162). θ is set to a slop for a line that connects I(left) and I(right) (step 164). Contact point I(mid) relative to θ is calculated (step 166). If I(mid) exists on the line that connects I(right) and I(left) (step 168), points on the convex hull no longer exist between I(left) and I(right), and program control returns to SEARCH&PRUNE (step 178).

When I(mid) exists above the line that connects I(left) and I(right), a greater value of either $f_{max}$ or f(I(mid)) is input to $f_{max}$ (step 170). Then, interval I is split into $I_1$=[I(left), I(mid)] and $I_2$=[I(mid), I(right)] (step 172). Further, $f(Q(I_1))$ and $f(Q(I_2))$ are calculated (step 174). Finally, $I_1$ and $I_2$ are added to the interval set S (step 176). Program control thereafter returns to SEARCH&PRUNE (step 178).

Since an interval for which a search is not required can be removed at an early stage in the above processing, a point on a desired convex hull can be obtained rapidly. It should be noted that although only the upper portion of the convex hull is processed in FIGS. 9 to 11, the same process can be applied for the lower portion by replacing the maximizing of θ in expression 1 (or expression 7) with the minimizing of θ. In addition, since the interclass variance acquired for the lower portion of the convex hull should be greater than that for the upper portion, the interclass variance value obtained for the upper portion can be employed for the removal of intervals, and the processing speed can be increased.

$$\sum_{(i,j) \in R} g(i, j) = \sum_{(i,j) \in R} (v(i, j) - \theta u(i, j)) \quad \text{[Expression 3]}$$

Figure 4:
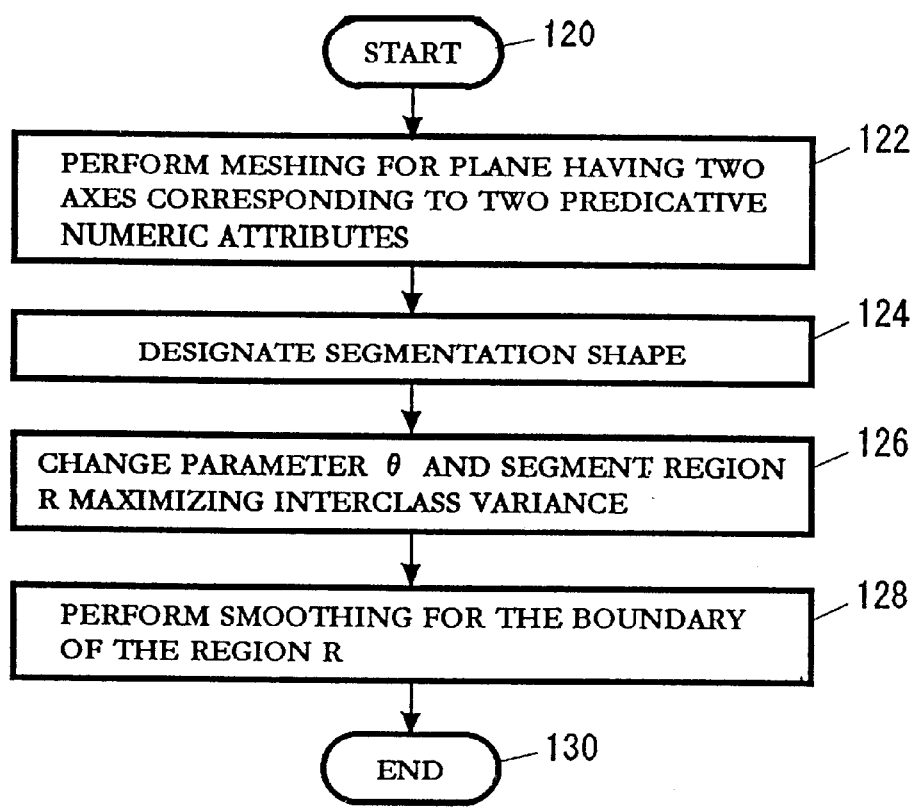
FIG. 4 is a a high level flowchart when a two-dimensional segmentation is executed.

The above description is as to the method for determining the probing parameter θ in the step 126 of FIG. 4. As apparent in the processing shown in FIGS. 8 to 10, as to one θ in order to obtain the value of the interclass variance, and the coordinate value on FIG. 6 ((x, y), x(R),y(R) in Expression 1), it is necessary to segment a specific region on the plane of FIG. 5. An algorithm for segmenting a region in x monotone including a base monotone when one θ is determined will be explained in Appendix A, and an algorithm for segmenting a region in rectilinear convex when one θ is determined will be explained in Appendix B.

Figure 11:
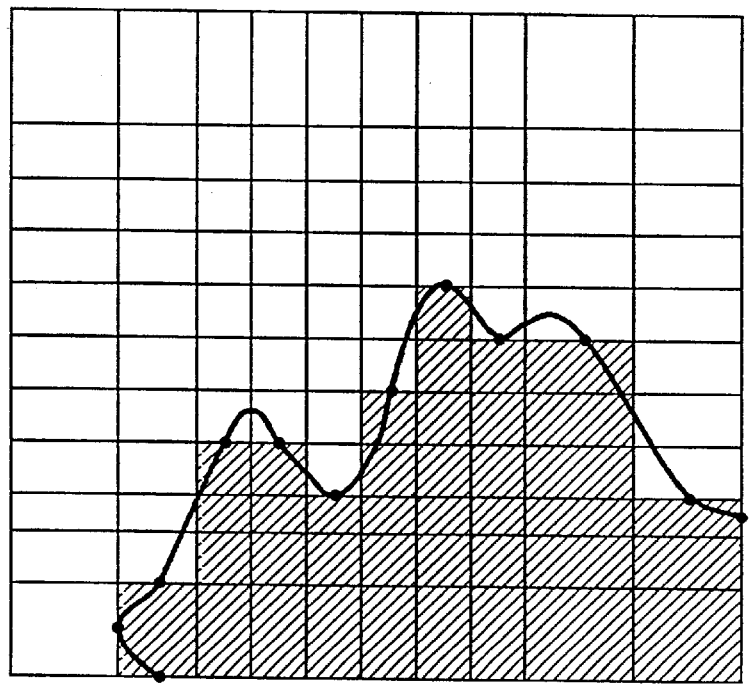
FIG. 11 is a first example of spline curve.
Figure 12:
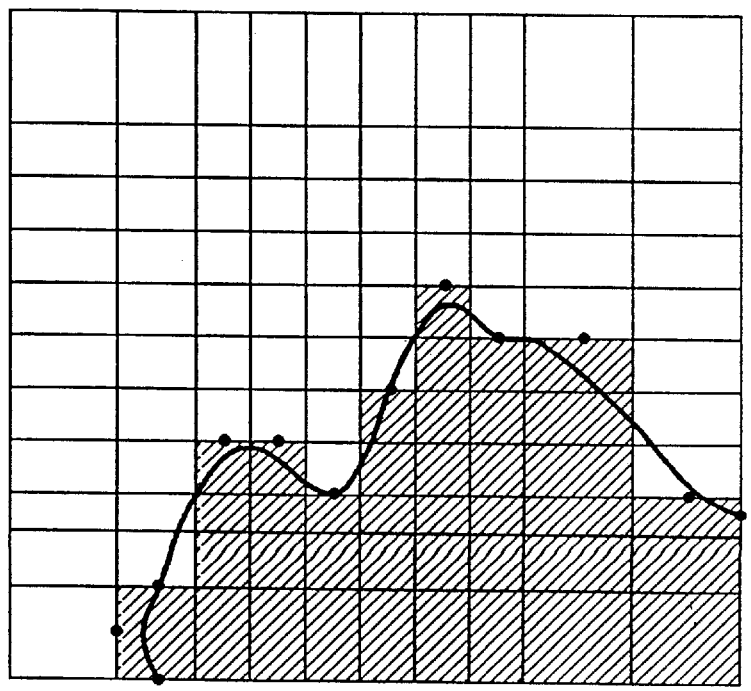
FIG. 12 is a second example of spline curve.
Figure 15:
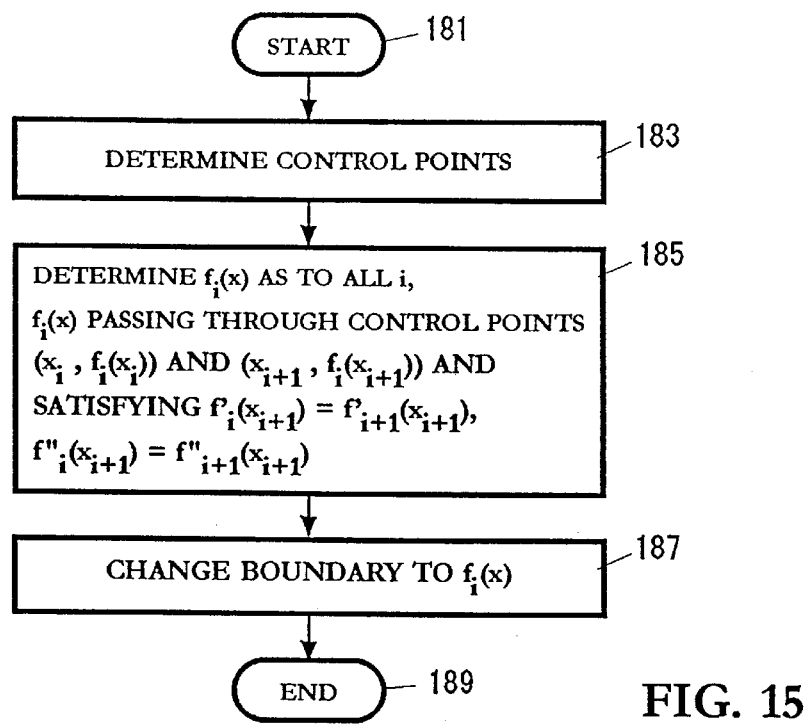
FIG. 15 is a diagram for explaining the processing flow with respect to the first example of the spline curve.

The boundary of the region segmented in step 126 is smoothed (step 127). First, an example of the region R is shown in FIGS. 11 and 12. The hatched region is the one segmented at step 126. The boundary of the segmented region is converted to a spline curve as shown in FIGS. 11 and 12. FIG. 15 shows what processing is performed in order to obtain the spline curve of FIG. 11. First, control points are determined (step 183). The control point is a midpoint of a side of a stripe of buckets. The side is in parallel with the horizontal axis. The stripe is in parallel with the vertical axis. Specifically, when the x coordinate (direction of the horizontal axis) of the stripe satisfies $A_1 < x < A_2$ and the y coordinate (direction of the horizontal axis) satisfies $B_1 < y < B_2$, the control points are the ones located at the positions represented by $((A_1+A_2)/2, B_1)$ and $((A_1+A_2)/2, B_2)$. Noted that the control point is not limited to these points and $(A_1+A_2)/2$ can be set between $A_1$ and $A_2$.

Figure 13:
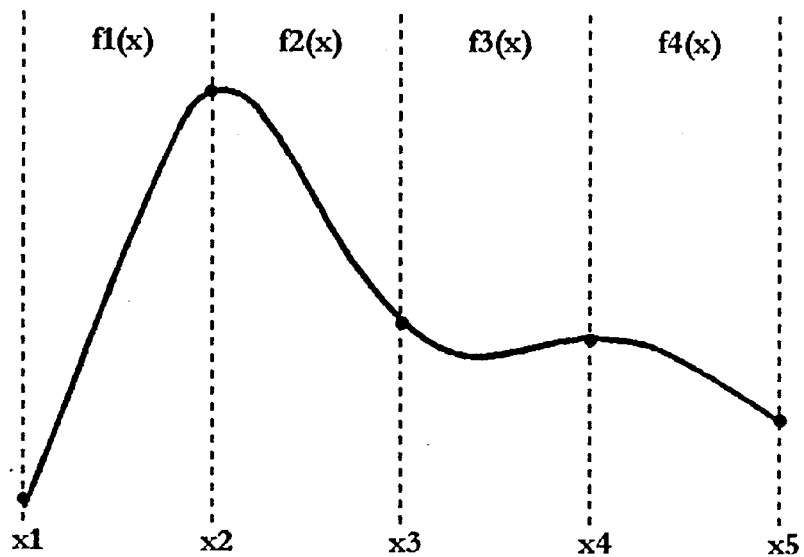
FIG. 13 is a graph for explaining the features of the first example of the spline curve.

$f_i(x)$ passes through the control points $x_i$ and $x_{i+1}$ and $f_i(x)$ satisfying $f_i'(x_{i+1})=f_{i+1}'(x_{i+1})$ (a first derivative is the same at $x_{i+1}$) and $f_i''(x_{i+1})=f_{i+1}''(x_{i+1})$ (a second derivative is the same at $x_{i+1}$) is determined for all i (step 185). As shown in FIG. 13, the interval from a control point $x_1$ to $x_2$ is $f_1(x)$ and the interval from a control point $x_2$ to $x_3$ is $f_2(x)$, and $f_1$ and $f_2$ passes through ($x_2$, $f_1(x_2)$) and ($x_2$, $f_2(x_2)$). In order to connect $f_1$ and $f_2$ smoothly, it is required that the first and second derivatives of $f_1$ and $f_2$ are equal at $x_2$. In this case, it is assumed that $f_i(x)$ be a tertiary polynomial expression. By $f_i(x)$ determined in the manner described above, the boundary of the region of each interval is changed (step 187).

Figure 14:
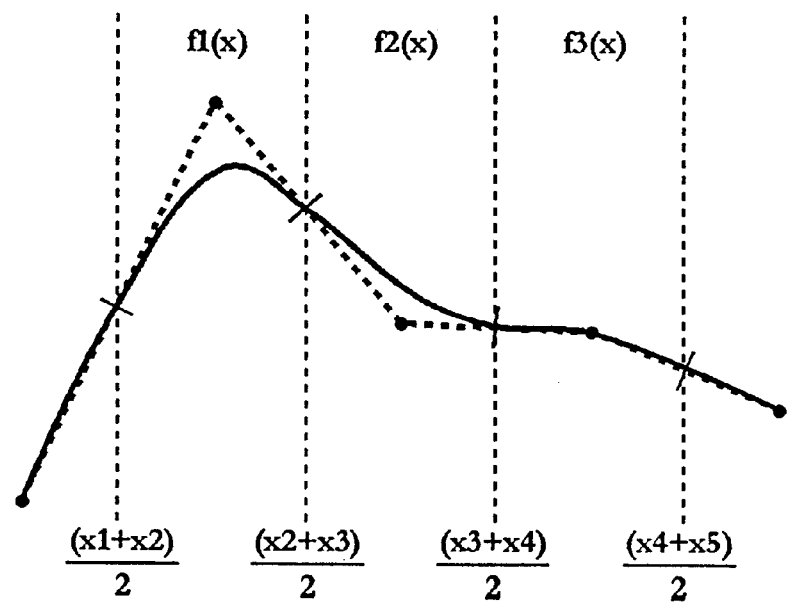
FIG. 14 is a graph for explaining the features of the second example of the spline curve.
Figure 16:
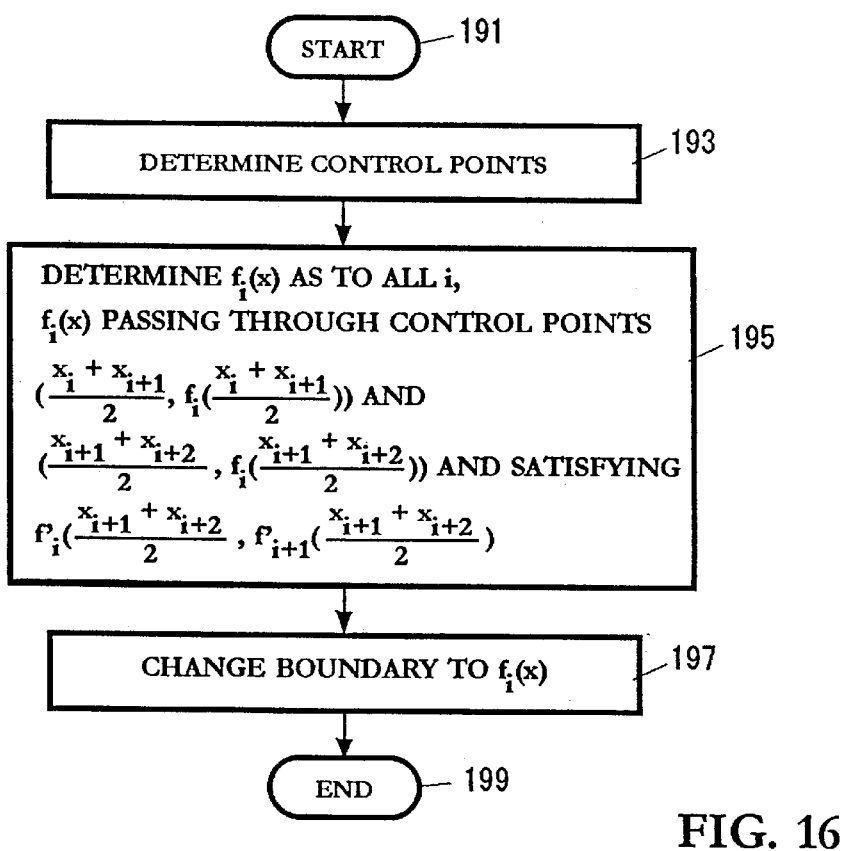
FIG. 16 is a diagram for explaining the processing flow with respect to the second example of the spline curve.

FIG. 12 shows the case where a spline curve which does not passes through the control points is set. The spline curve may be B spline. In this case, the control points are set like in FIG. 15 (FIG. 16: step 193). As shown in FIG. 14, one interval is formed by midpoints of straight lines which connect control points adjacent to each other. $f_i(x)$ passes through this midpoint. Specifically, one interval is from $(x_i+x_{i+1})/2$ to $(x_{i+1}+x_{i+2})$, and $f_i$ passes through these points. $f_i$ in FIG. 14 passes through $((x_1+x_2)/2, f_1((x_1+x_2)/2))$ and $((x_2+x_3)/2, f_1((x_2+x_3)/2))$. Moreover, at a midpoint between the control points adjacent to each other, the first derivative has the same value. Specifically, $f_i'((x_{i+1}+x_{i+2})/2)=f_{i+1}'((x_{i+1}+x_{i+2})/2))=(y_{i+2}-y_{i+1})/(x_{i+2}-x_{i+1})$ is satisfied. $f_i(x)$ satisfying these conditions is obtained for all of i (step 195). Each interval is changed using $f_i(x)$ (step 197).

As understood by referring FIGS. 11 and 12, as to the stripes on the right and left end in the segmented region, the control point is provided at the midpoint on the side in parallel with the vertical axis on the right end, as well as at the midpoint on the side in parallel with the vertical axis on the left end. Note that the control points need not necessarily be on the midpoints. Moreover, the control point can be provided not only at the uppermost end of the boundary of the regions but also on the lowermost end, similar processing can be executed. In the case of FIGS. 11 and 12, since a base monotonous region described later is segmented, in order to round its corner, only for the stripes on the right and left ends, the control point is provided at the lowermost end of the region. As to the x monotonous and rectilinear convex regions, the control points are provided in the upper and lower portions of all of the stripe. Then, a conversion to a spline curve, for example, is performed.

By performing the above described processing, the boundary of the segmented region can be changed to the spline curve as shown in FIGS. 11 and 12, and the processing in FIG. 4 is terminated (step 128).

The example in the case where the regression tree is generated was described as above. Next, the processing in the case where a decision tree is generated will be described. In the case of the decision tree, an objective attribute is not a numeric attribute, but it is a true-false attribute. More generally, the objective attribute takes one of j discrete values. Consequently, the following conditions are used.

(1) In the Case of Confidence Maximization Rule

A confidence maximization rule is a rule so as to maximize the ratio of data whose true-false attribute value is true when the minimum number of data included is defined. The number of data included in the region R is called a support, and the minimum support minsup represents the number of data included in the region R. Assume the number of data included in a region R is x(R); among data included in the region R, the number of data whose true-false objective attribute value is true is y(R); the number of data on all over the plane (FIG. 5) be Usum; and as to data on all over the plane, the number of data whose objective attribute value is true is Vsum. The rule to maximize the confidence can be derived by the following procedures.

Figure 17:
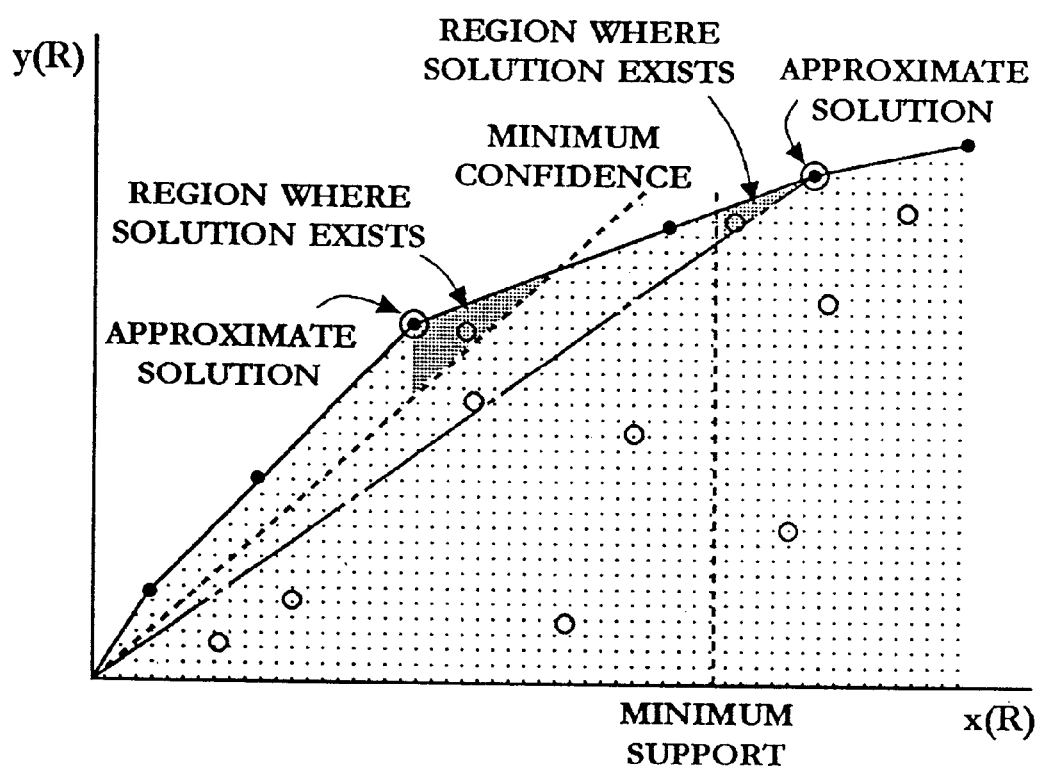
FIG. 17 is a graph showing an x(R), y(R) plane.
Figure 18:
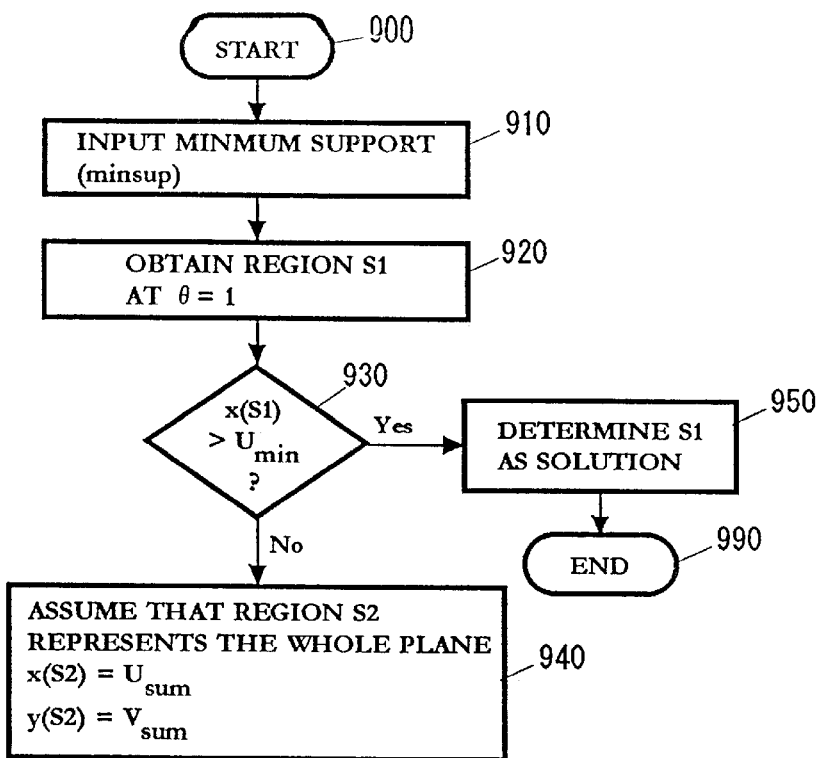
FIG. 18 is a diagram for showing a portion of a process for deriving the confidence maximization rule.

First, the minimum support minsup is input (see FIG. 18, step 910). Here, Umin=Usum×minsup is previously calculated. Referring to FIG. 17, the vertical dotted line noted as the minimum support corresponds to the values obtained by the calculation. The region S1 is first obtained by θ=1 (step 920). Then, it is determined whether the number of data x(S1) included in the region S1 satisfies x(S1)×Umin or not (step 930). If x(S1)×Umin is established, S1 is determined as a solution (step 950) and the processing is finished (step 990). If x(S1)×Umin is not established, the region S2 is regarded as an image illustrating all of the plane. Specifically, x(S2) is substituted by Usum and y(S2) is substituted by Vsum (step 940). Then, the processing moves to FIG. 19 via XX.

Figure 19:
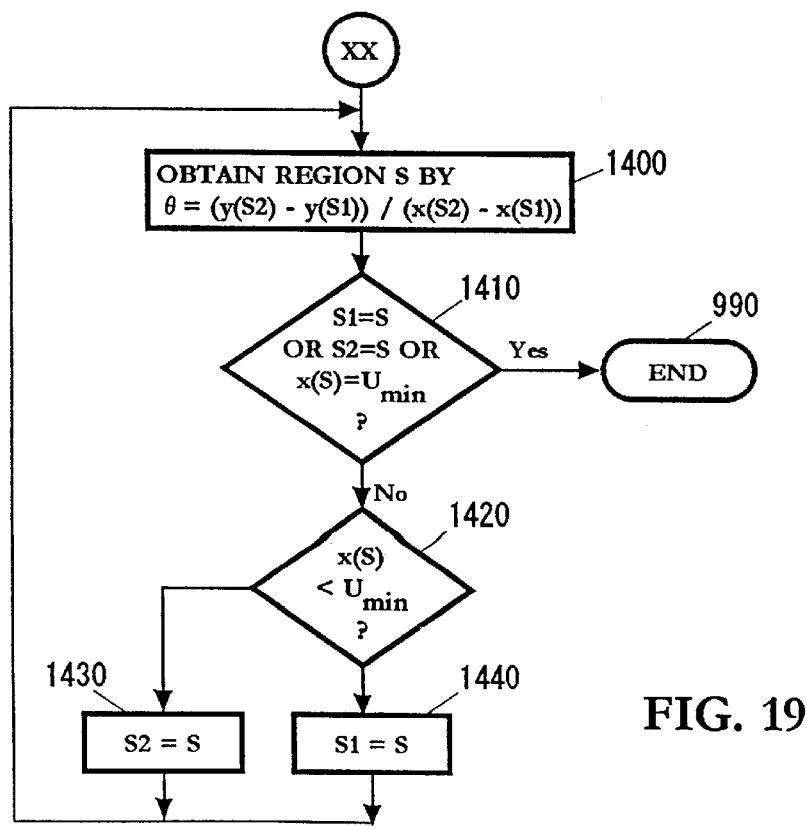
FIG. 19 is a diagram for showing a portion of a process for deriving the confidence maximization rule.

In FIG. 19, the processing begins from XX, a new condition θ is obtained, and the region S is computed for the condition θ (step 1400). This θ is computed by the expression θ=(y(S2)-y(S1))/(x(S2)-x(S1)). If S1=S or S2=S satisfies, since any point on the convex hull does not exist between (S1, S2), S2 with high confidence is output as the best solution, and the processing is terminated (step 1410). If x(S)≈Umin is satisfied, S is output, and the processing is terminated.

When x(S)<Umin is satisfied (step 1420), since more processing needs to be performed, S is set to S1 (step 1440), and the processing returns to step 1400. Similarly, if x(S) >Umin is satisfied, S is set to S2 (step 1430), and the processing returns to step 1400.

A solution can be found by repeating these processings. Referring to FIG. 17, in the portion dyed in black on the right side of the minimum support described before, there is a scope where a solution exists. In the case of FIG. 17, the points illustrated by a white circle inside the convex hull give a strict solution. In the present invention, an approximate solution obtained by the hand probe is output.

(2) In the Case of a Support Maximization Rule

Figure 20:
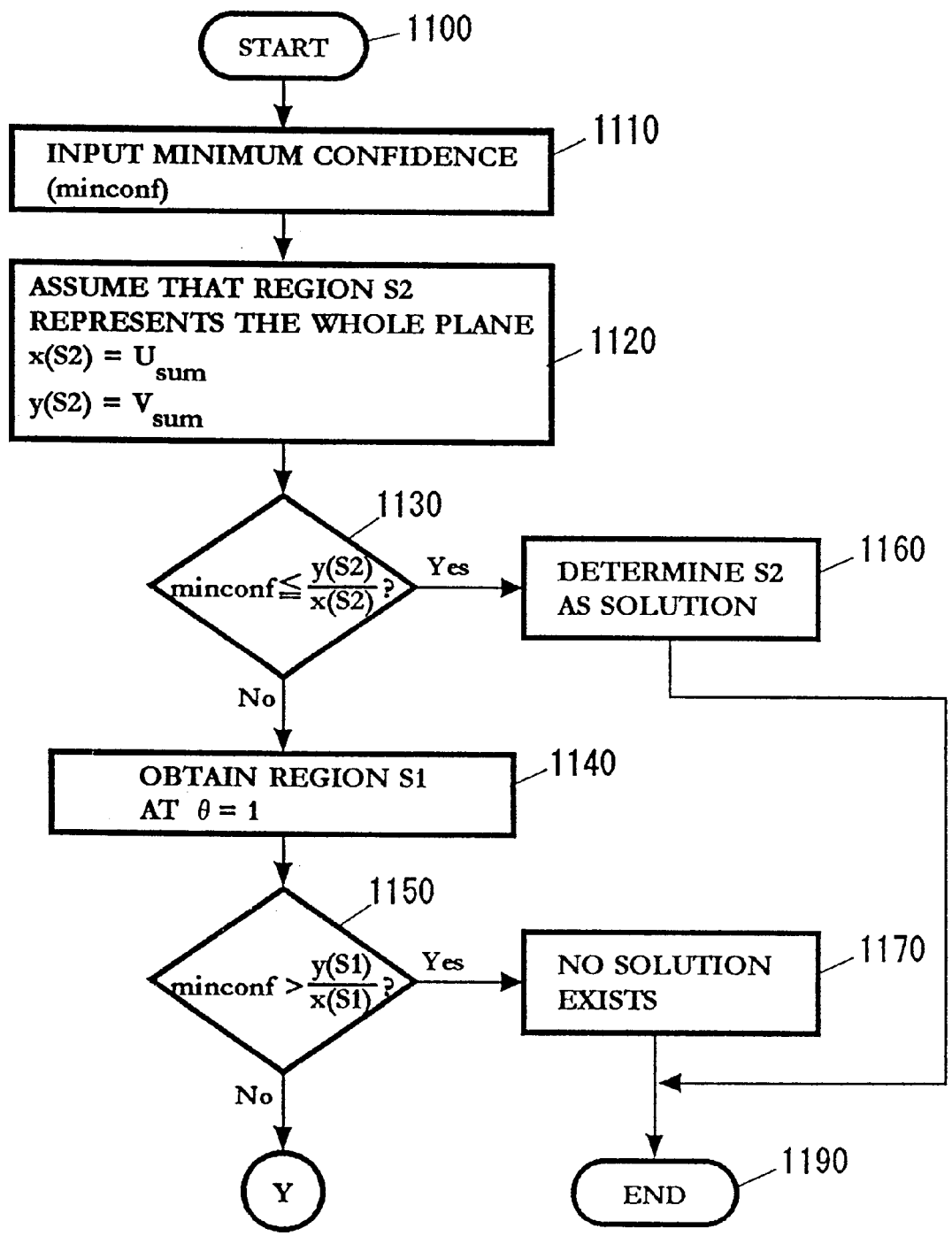
FIG. 20 is a diagram for showing a portion of a process for deriving the support maximization rule.

This is a rule in which a rate of data whose true-false objective attribute value is true is equal to or more than a predetermined value and the number of included data (support) is maximized. First, according to the definition of the rule, the minimum confidence minconf (a rate of the number of data whose true-false attribute value is true relative to the number of data included in the region R) is input (FIG. 20: step 1110). In the case of FIG. 17, a doted line indicated as the minimum confidence and drawn from the origin corresponds to the minimum confidence. First, it is assumed that the region S2 represents the overall of the plane. Specifically, x(S2) is substituted with Usum, and y(S2) is substituted with Vsum (step 1120). Then, it is determined whether minconf≦y(S2)/x(S2) is established or not (step 1130). If this condition is established, it is determined that S2 is a solution (step 1160), and the processing is terminated (step 1190). If this condition is not established, the region S1 is obtained under the condition that θ is 1 (step 1140). Then, it is determined whether minconf>y(S1)/x(S1) is established or not (step 1150). If this condition is established, a solution does not exist, and the processing is terminated. If this condition is not established, the processing moves to FIG. 24 via Y.

Figure 21:
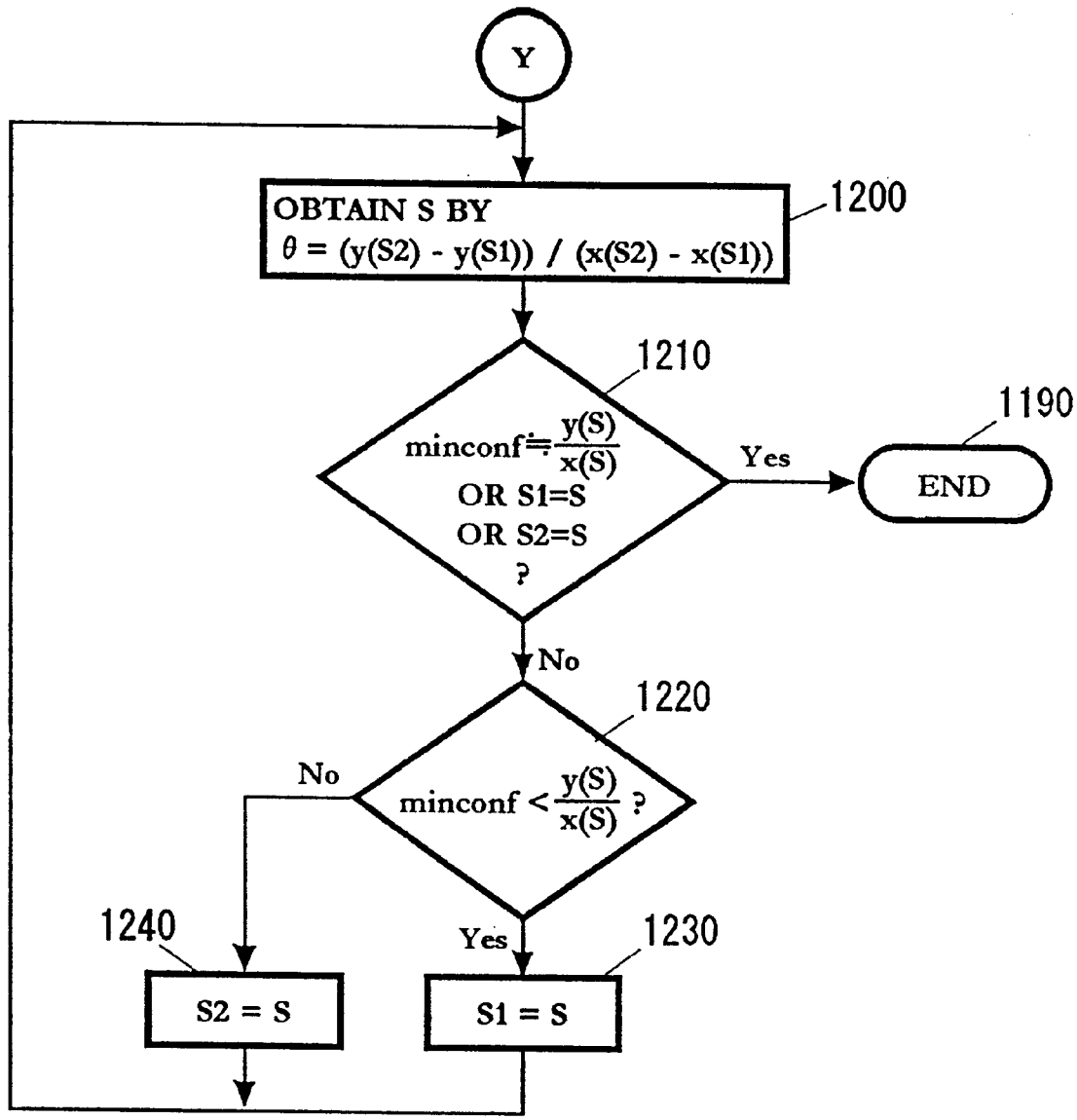
FIG. 21 is a diagram for showing a portion of a process for deriving the support maximization rule.

In FIG. 21, the processing starts from Y. The region S is obtained assuming that θ=(y(S2)-y(S1))/(x(S2)-x(S1)) (step 1200). In the case where (1)minconf≈y(S)/x(S) is established for the region S, the region S is output, and the processing is terminated (step 1210). Moreover, if S1=S or S2=S is established, since no solution exists between S1 and S2, S1 is output as the best solution, and the processing is terminated (step 1210). On the other hand, in the case where minconf<y(S)/x(S) is established (step 1220), S1=S is established, and the processing returns to step 1200 (step 1230). Moreover, when minconf>y(S)/x(S) is established, S2 is substituted with s, and the processing returns to step 1200 (step 1240).

In the above-described manner, the support maximization rule is obtained. Returning to FIG. 17 once more, a solution exists in the scope painted in black, which is located above the dotted line shown as the minimum confidence described above. In this example, though the points drawn by the white circle within the convex hull are a strict solution, since the enormous quantity of computations is required to find out the points within the convex hull as described above, an approximate solution which maximizes the support at the point on the convex hull is output. Furthermore, even when the objective attribute is a numeric attribute, the support maximization rule is in some cases adopted. In this case, the sum of the values of the objective numeric attribute included in the region R is employed for y(R).

(3) In the Case of an Optimization Entropy Rule

When splitting of the internal and external portions of the region is considered, an optimization entropy rule is a rule which maximizes the increase of mutual information after the splitting, compared with the mutual information before splitting. Therefore, it is satisfactory that a region which maximizes the entropy gain (expressed by a following expression) of the segmented region and the entire plane is found out (segmented).

$$f(x, y) = -\frac{y}{a}\log\frac{y}{a} - \frac{x-y}{a}\log x - \frac{y}{a} - \frac{b-y}{a-x}\log b - \qquad \text{[Expression 4]}$$
$$\frac{y}{a-x} - \frac{a-b-x+y}{a-x}\log a - b - x + \frac{y}{a-x}$$

wherexis x(R), y is y(R), a is Usum and b is Vsum. Since a solution exists on the convex hull also in the case of such conditions, the processing similar to the above can be employed. Consequently, θ is changed, and it is satisfactory that a region which maximizes the expression 4 may be obtained.

Any of the following conditions and the optimization entropy rule are obtained by numerically expressing extent to which the distribution of the values of the objective attribute in the data set split by the region R, i.e., the rule R, is different from the distribution of the original data. Here, it is assumed that the rule R divides the data set S into $S_1$ and $S_2(=S-S_1)$. When it is assumed that the objective attribute has one of j discrete values and $x_i(S)$ pieces of data (i=1, 2, . . . , j) taking the i-th value exist in the data set S, the data set S can be represented by the vector x(S) on the j-dimensional space. Similarly, the rule R can also be represented by the vector $x(S_1)$ on the same j-dimensional space, and the evaluation function for evaluating the distribution of the data is represented using these vectors. Note that the distribution ratio of the i-th value in the subset $S_1$ shall be represented by $p_i(S_1)=x_i(S_1)/|S_1|$.

(4) In Case of Maximization of GINI Index Function

When the data set is divided by a certain rule R, the GINI index function is used to minimize the error rate of the objective attribute values taking two values. The form of the evaluation function is as follows.

$$Gini(R) = Gini(x(S_1)) = \left(1 - \sum_{i=1}^{k} p_i(S)^2\right) - \qquad \text{[Expression 5]}$$
$$\frac{|S_1|}{|S|}\left(1 - \sum_{i=1}^{k} p_i(S)^2\right) - \frac{|S_2|}{|S|}\left(1 - \sum_{i=1}^{k} p_i(S)^2\right)$$

The region R which maximizes such a GINI index function may be to subjected to the hand probe on the plane as shown in FIG. 5, in the manner similar to when the interclass variance is maximized. Specifically, the region R is computed for one probing parameter θ, and the evaluation values according to the Expression 5 are computed for the data both inside and the outside of the region. Then, the probing parameter θ is changed, and the computation is iterated until the evaluation value according to the Expression 5 becomes maximum.

(5) In Case of Maximization of χ Square Function

When data is divided according to a certain rule R, the χ square function is used for most strongly denying the so-called null hypothesis in statistics. The null hypothesis means that there is no significant difference between two data distributions. One is the data distribution of the objective attribute values in the original data set, the objective attribute value being a binary attribute, and the other is the data distribution of the objective attribute values in the data set after the division.

The form of the evaluation function is as follows:

$$Chi(R) = Chi(x(S_1)) = \qquad \text{[Expression 6]}$$
$$\sum_{i=0}^{k} \frac{|S_1|(p_i(S_1)-p_i(S))^2 + |S_2|(p_i(S_2)-p_i(S))^2}{p_i(S)}$$

Also in this case, the probing parameter θ is changed, and the region R is segmented for each probing parameter θ, whereby the region R which maximizes the Expression 6 is found out.

(6) In Case of Maximization of the Interclass Variance

Even when the objective attribute is a true-false attribute, the rule for maximizing the interclass variance is sometimes adopted.

Using a region R which satisfies the above condition as a rule R, nodes are generated in the decision tree or the regression tree. Processings for segmenting a region R when a certain probing parameter θ is determined are described in the following sections.

Appendix A.

Algorithm for Segmenting an x Monotone Region

It assumes that processing is completed as far as a plane forming in step 122 represented in FIG. 5. Each mesh element stores the number u(i,j) of tuples which belong to the mesh element (i,j) among data set D (u(i,j) is also called data number.) and the sum v(i,j) of values of the objective numeric attribute of tuples which belong to the mesh element (i,j) among data set D. Note that i is a coordinate value in the vertical axis and j is a coordinate value in the horizontal axis on the plane shown in FIG. 5.

Figure 22:
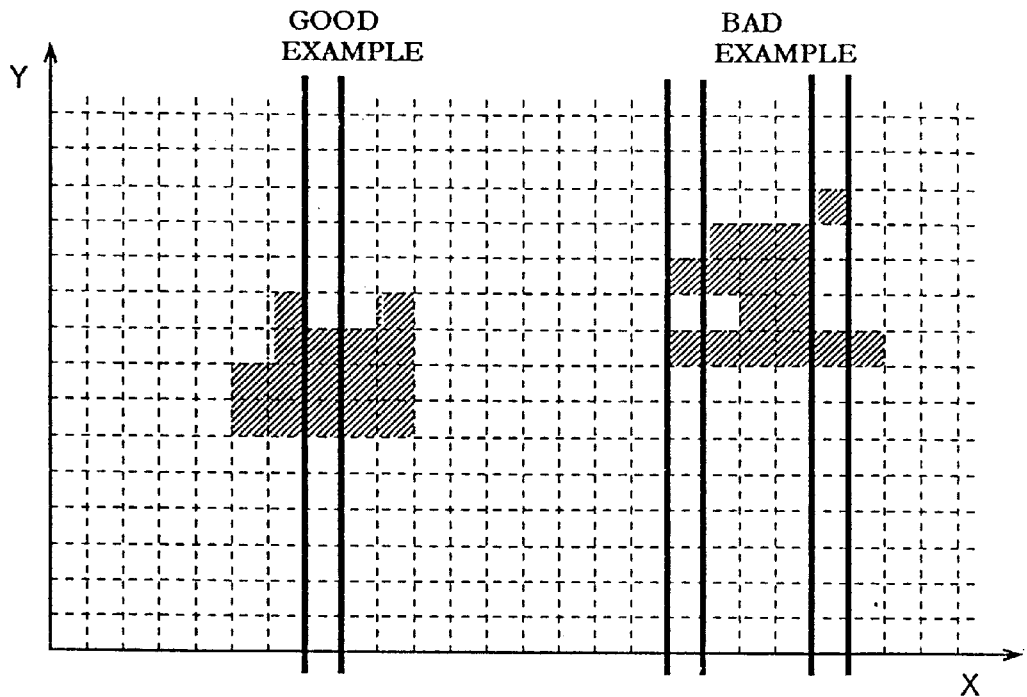
FIG. 22 is a drawing for explaining an x monotone region.

First, an x monotone region is explained. Shown in the left of FIG. 22 is an example where a region is always connected when it is cut by bands with width 1 extending in the Y-axis direction. Such region is called the x monotone region. In the right, there is shown an example where a region is not connected when it is cut by the bands described above. The region in the right is not x monotone. The problem for segmenting an x monotone region can be solved by sequentially connecting bands extending in the Y-axis direction by using dynamic programming, since they are always connected.

As described above, drawing a straight line with gradient (slope) θ from the top by using hand probing means reducing A which is a Y-intersect of a straight line y=θx+A. In other words, it is a problem to find a point on the plane shown in FIG. 6, which has the X-coordinate x(R) which maximizes A=y(R)−θx(R). Thus, it is modified to:

$$maxA = \max[y(R) - \theta x(R)] \quad \text{[Expression 7]}$$

$$= \max\left\{\sum_{(i,j) \in R} v(i,j) - \theta \sum_{(i,j) \in R} u(i,j)\right\}$$

$$= \max \sum_{(i,j) \in R} g(i,j)$$

where $$g(i,j) = v(i,j) - \theta u(i,j) \quad \text{Expression 8}$$

Now, it is considered how to solve Expression 7. Basically, an approach using the dynamic programming described earlier is employed. First, an area comprising buckets to the left of m-column and including a bucket at a position (m, t) is assumed, and that maximizing an objective function, Expression 8, is to be f (m, t). Then, it satisfies the following conditions:

$$f(m, t) = \max_{t, l \in I}\left\{f(m-1, l) + \underbrace{\sum_{i \in I} g(i, m)}_{B}\right\} \quad \text{[Expression 9]}$$

$$= \max_{l}\left\{f(m-1, l) + \underbrace{\max_{t, l \in I} \sum_{i \in I} g(i, m)}_{A}\right\}$$

where A is the second term, and B is the result of the sum operation in the second term.

A in Expression 9 means to determine from the entire continuous interval (range) containing t and l a continuous interval (range) I maximizing B in Expression 9. See FIG. 23. It is the same plane as in FIG. 5.

This I is represented as cover (t, l). Now, if t≦l, and low (t) and high (l), which are defined later, are used, $$cover(t,l) = [low(t), t] \cup [t, l] \cup [l, high(l)] \quad \text{Expression 10}$$

where low (t) is i maximizing B in Expression 9 in the entire continuous interval [i, t], while high (l) is j maximizing B in Expression 9 in the entire continuous interval [l, j].

Since these low (t) and high (l) are frequently used in the dynamic programming, it is effective if they are quickly found. To this end, a matrix K is constructed in which B in Expression 20 of the continuous interval [i, j] is contained in an element K (i, j), where K (i, j)=(i−j) x for i>j (x is a negative value with a sufficiently large absolute value. For example, it is sufficient to be a number the absolute value of which is larger than sum of entire u (i, j)). Then, the column number for a column having the maximum value at row number l becomes high (l). Thus, the problem to find high (l) for all l∈[1, N] becomes a problem to find column number for the maximum value at each row of K. Such calculation can be performed with amount of calculation for O (N). When determining the maximum column number, the comparison of the matrix elements is performed for judging whether the value is maximum.

When the maximum value of each row is noted in K, the column number for maximum value monotonically increases as the row number increases. However, if there are a plurality of maximum values on the same row, only the one at the left end is considered. Such matrix is referred to a "monotonic matrix." Although its demonstration is omitted, the matrix K is also a "completely monotonic matrix" (a matrix in which any partial matrix is a monotonic matrix). O (N log N) as amount of the calculation is required to calculate column numbers having the maximum values at all rows in a monotonic matrix. The algorithm for finding the column number of the maximum value in each row is well known, and described, for example, in Chapter 4 "Basic Technique of Computational Geometry" of "Computational Geometry," Tetsuo Asano, Asakura Shoten, September 1990.

Likewise, when low (t) is calculated, it is obtained by constructing a matrix L in which B in Expression 9 of the continuous interval [i, j] is contained in an element L (j, i), and finding the column number for a column having the maximum value at the row number t. Here, the upper triangular area (i>j) is to be −∞. Such matrix is also a completely monotonic a matrix.

Using low (t) and high (l) thus found, cover (t, l) can be found so that the following equation which is a variation of Expression 9 can be calculated.

$$f(m, t) = \max_{l}\left\{f(m-1, l) + \sum_{i \in cover(t,l)} g(i, m)\right\} \quad \text{[Expression 11]}$$

A region making f (m, t) maximum can be found by sequentially calculating f (m, t) for bands perpendicular to the X-axis, storing these bands, and then connecting them. See FIG. 23. X and Y are axes respectively corresponding to two numeric attribute.

To further improve the speed, a matrix M is constructed which has $$M(t, l) = f(m-1, l) + \sum_{i \in cover(t,l)} g(i, m) \quad \text{[Expression 12]}$$

as its element. Then, the maximum value of the row number t is f (m, t). M is a completely monotonic matrix described above, and f (m, t) can be calculated for all t with O (N). Thus, O (N²) as amount of calculation is necessary to calculate f (m, t) for all m.

While detail is described in the above, necessary steps are as follows:

(1) Calculate low (t) and high (l) for all bands perpendicular to the X-axis.

(2) Calculate a matrix M whose element is Expression 12 since cover (t, l) is found from low (t) and high (l).

(3) Find the maximum value of each row in the matrix M, and store their values as f (m, t).

(4) Enter the column number l storing the maximum value of each row in the matrix M into s (m, t) to determine the entire region.

(5) Find m and t maximizing f (m, t), and determine the region with low (t) and high (l) of the previous column by using s (m, t) obtained in (4) and l stored in s (m, t).

Because it is necessary to calculate the interclass variance, x(R) and y(R) are also necessary. See Expression 13 and Expression 14. This calculation may be performed after the determination of the entire region or during the determination.

$$\sum_{(i,j) \in R} u(i, j) \qquad \text{[Expression 13]}$$

$$\sum_{(i,j) \in R} v(i, j) \qquad \text{[Expression 14]}$$

Figure 24:
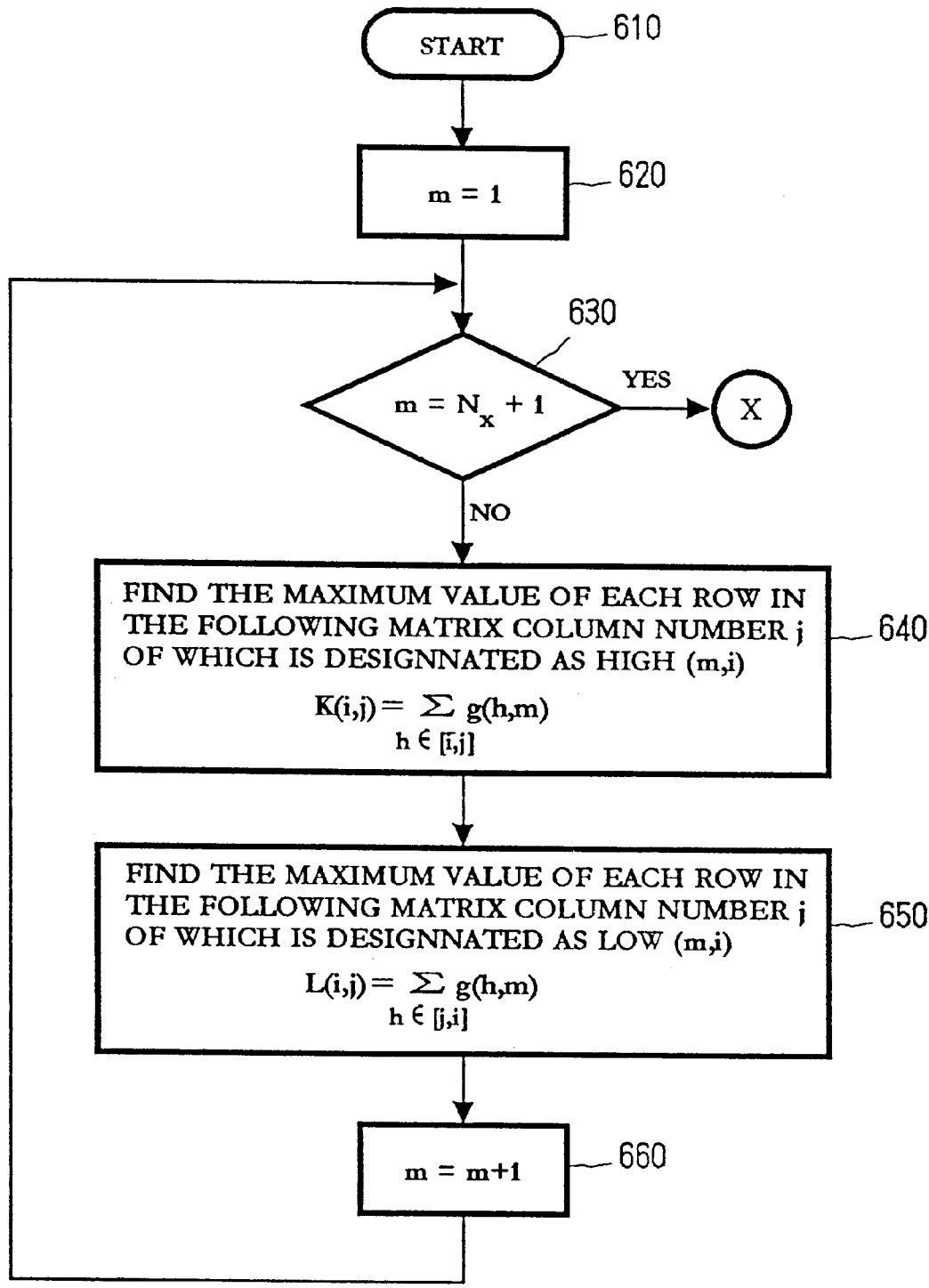
FIG. 24 is an example flowchart for segmenting an x monotone region.
Figure 25:
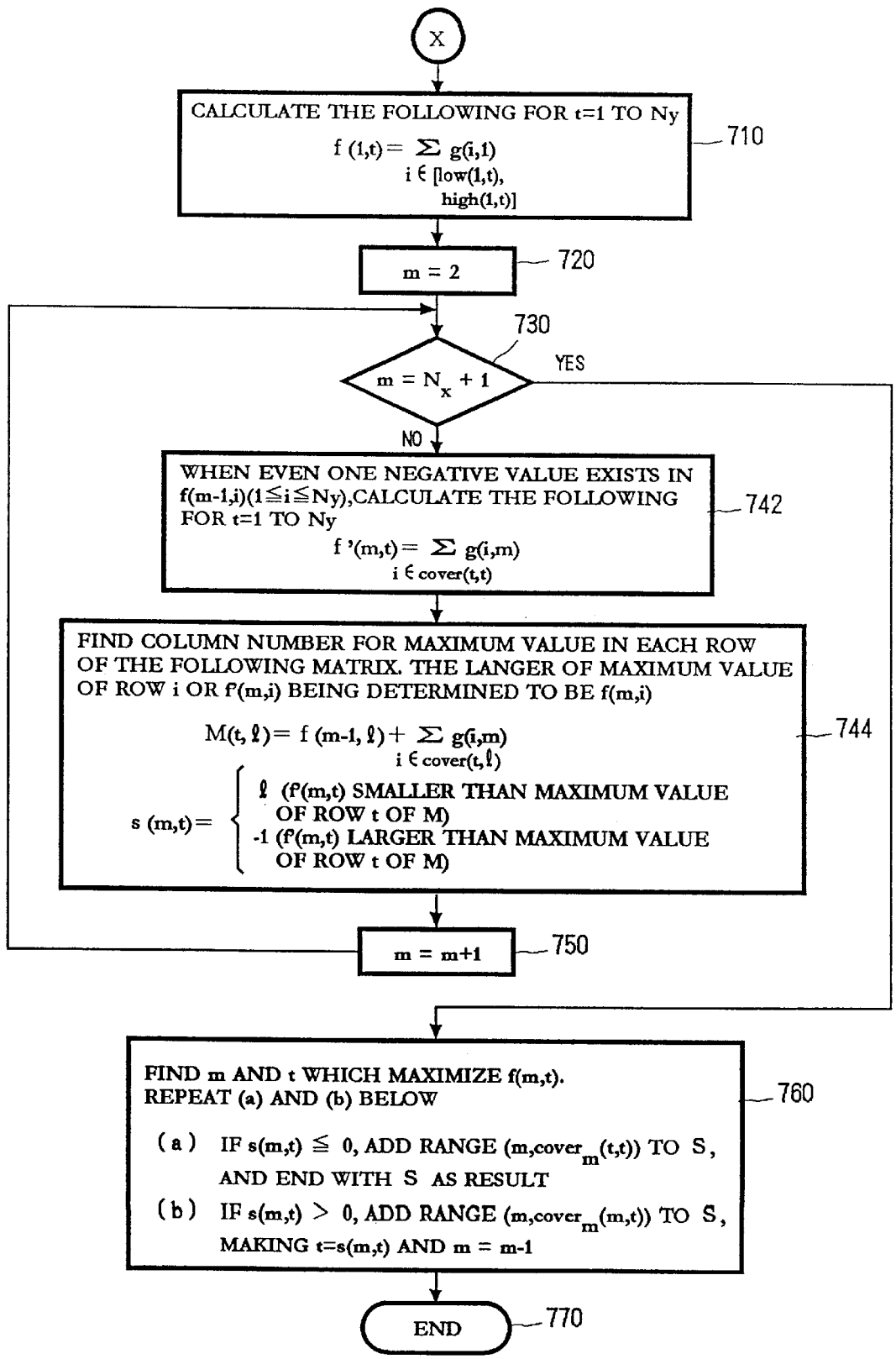
FIG. 25 is an example flowchart for segmenting an x monotone region.

These steps are shown in FIGS. 24 and 25. The process started at step 610 performs initialization of m=1 at step 620. It is then determined whether m=$N_x$+1 (step 630). This is to repeat the loop N. times where $N_x$ is the number of columns in u (i, j) and v (i, j).

Then, $$K(i, j) = \begin{cases} (i, j)x & (i > j) \\ \sum_{h \in () } & i \le j \end{cases} \qquad \text{[Expression 15]}$$

is calculated to find the maximum value of each row in this matrix the column number j of which is designated as high (m, i) (step 640). Thus, high (i) on m-th column of the plane (FIG. 23) is found.

In addition, $$L(i, j) = \begin{cases} -\infty & (j > i) \\ \sum_{h \in [j,i]} & (j \le i) \end{cases} \qquad \text{[Expression 16]}$$

is calculated to find the maximum value of each row in this matrix the column number j of which is designated as low (m, i)=j (step 650). Thus, low (i) on m-th column of the plane (FIG. 23) is found.

Then, the process increments m by 1 (step 660), and returns to step 630. As described, first, all low and high are previously calculated. Although it may be arranged to calculate necessary low and high every execution of calculations in FIG. 15, they may be calculated at once as in this example. After they are calculated at once as described above, the process proceeds to FIG. 25 through X.

Figure 23:
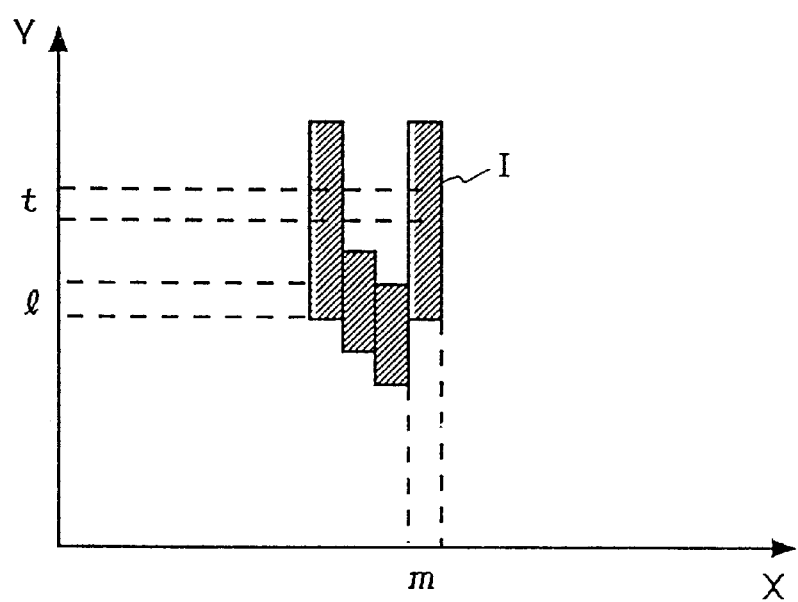
FIG. 23 is a drawing for explaining a method for deriving an x monotone region while keeping connectivity.

In FIG. 25, the process calculates f (m, t) from X. First, processing is performed on the left most column of said plane as shown in FIG. 23.

$$f(1, t) = \sum_{i \in [low(1,t), high(1,t)]} g(i, 1) \qquad \text{[Expression 17]}$$

is calculated for t=1 to $N_y$ (step 710). Here, $N_y$ is the number of rows in u (i, j) and v (i, j). With such procedure, one to be the initial value of the first term in Expression 12 is calculated.

In addition, it is arranged s (l, t)=−1. This is to explicitly indicate that there is no connection in the previous column because this is the first column.

Then, m is set to m=2 to calculate values for m=2 and thereafter (step 720). In addition, it is determined whether m=$N_x$+1 to repeat the loop ($N_x$−1) times (step 730). If not m=$N_x$+1, and when even one negative value exists in f (m−1, i) (1≦i≦$N_y$)

$$f'(m, t) = \sum_{i \in cover_m(t,t)} g(i, m) \qquad \text{[Expression 18]}$$

is calculated for t=1 to $N_y$ (step 742). Here, $cover_m$ (t, t) means cover (t, t) on the m-th column. Then, $$M(t, l) = f(m-1, l) + \sum_{i \in cover_m(t,l)} g(i, m) \qquad \text{[Expression 19]}$$

The column number for the maximum value in each row of this matrix is found (step 744). Then, the maximum value of row i is compared with f' (m, i), and the larger one is determined to be f (m, i). Then, l is placed in s (m, t) when f' (m, t) is smaller than the maximum value of row t in M, otherwise, −1 is placed. This is to determine whether the value of the objective function for the region to be segmented is made larger by preserving the connection up to the previous column, or by discarding it.

Since, as described, s (m, t) is provided to preserve the connected state, if an (m, t) is determined, it can be determined later how the areas (stripes) are connected by tracing back s (m, t).

Then, the process increments m by 1 (step 750), and returns to step 730. When the repetition completes, m and t maximizing f (m, t) are found. It is sufficient that m and t always providing maximum are arranged to be continuously held while constructing f (m, t), and to be updated when a point which has a value lager than that of m and t being held is encountered in a newly created region. l for the previous column is found from s (m, t) by using m and t. The smaller of l and t is entered in low, and the larger is entered in high. For example, if t is the smaller, low (m, t) and high (m, l) can be found. Furthermore, since l' in the previous column is found from s (m−1, l), low (m−1, l') and high (m−1, l') are found. (Here, l is smaller than l'.) When such procedure is repeated, the entire region R can be determined (step 760). When −1 is obtained for a certain s (m, t), the region completes. This completes the process because the x monotone region R corresponding to the gradient θ which has been input is obtained (step 770).

If low (t) or high (t) is fixed to a predetermined value, it is possible to segment a base monotone region in the same processing.

Appendix B.
Algorithm for Segmenting a Rectilinear Convex Region

Figure 26:
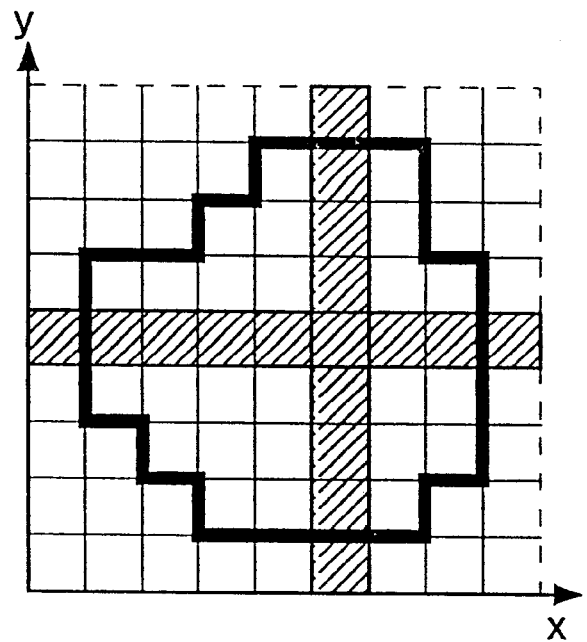
FIG. 26 is a drawing for explaining a rectilinear convex region.
Figure 26:
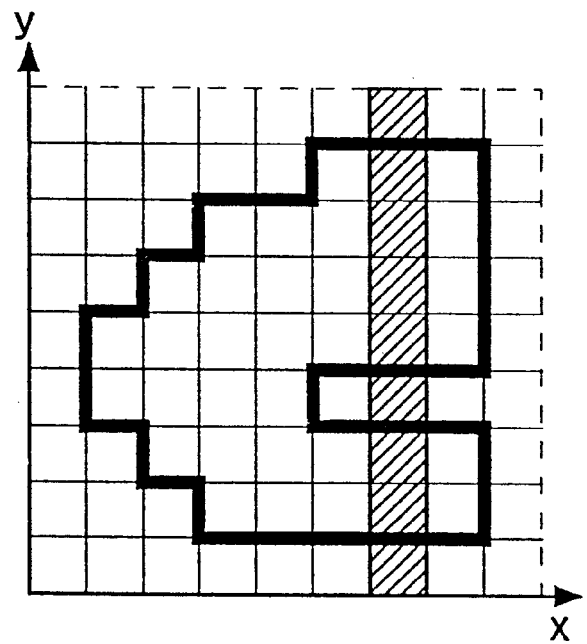

This process is to segment a rectilinear convex region from the previously created plane. An example of the rectilinear convex region is shown in FIG. 26. The rectilinear convex region means a region in which (1) the stripes which overlap with lines parallel with the y-axis are always continuous or empty, and (2) the stripes which overlap with lines parallel with the x-axis are always continuous or empty. The left region in FIG. 26 is a rectilinear convex region, because the stripes which overlap with any line parallel with the y-axis are continuous or empty and the stripes which overlap with any line parallel with the x-axis are continuous or empty. On the other hand, in the right region in FIG. 16, the stripes which overlap with lines parallel with the x-axis are always continuous or empty, but the stripes which overlap with lines parallel with the y-axis include those which are not continuous. Accordingly, this region is not a rectilinear convex region.

Figure 27:
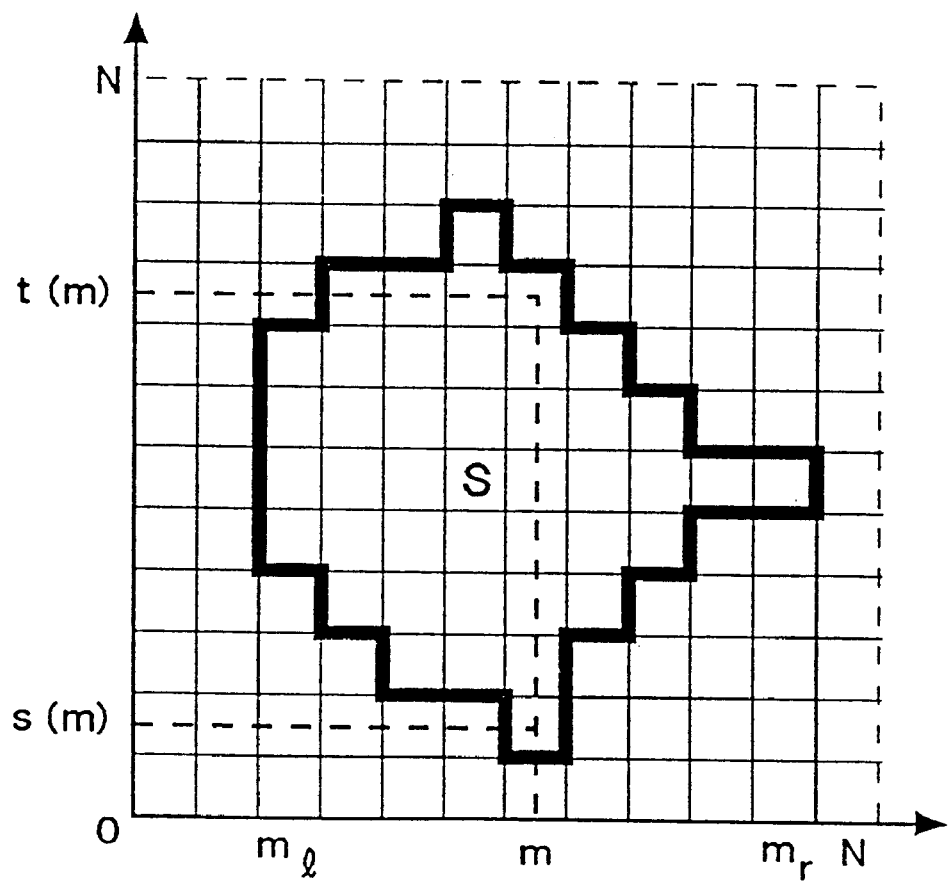
FIG. 27 is a drawing for explaining the nature of the rectilinear convex region.

Because background conditions are the same as in the segmentation of the x monotone region, the Expression 7 must be solved. First, the nature of a rectilinear convex region is represented by the relation among pixels (buckets) in the region. R is assumed to be a rectilinear convex region in a pixel plane (a bucket plane). $m_l$ and $m_r$ are assumed to be the column numbers of the left end and the right end of R, respectively. The pixel numbers of the lower end and the upper end of the m-th column ($m_l \leq m \leq m_r$) of R are assumed to be s(m) and t(m), respectively. These positional relationships are well understood if FIG. 27 is referenced. The tendency of change of the section [s(m), t(m)] in the m-th column is defined as follows by comparison with the section in the m-1-th column.

Figure 28:
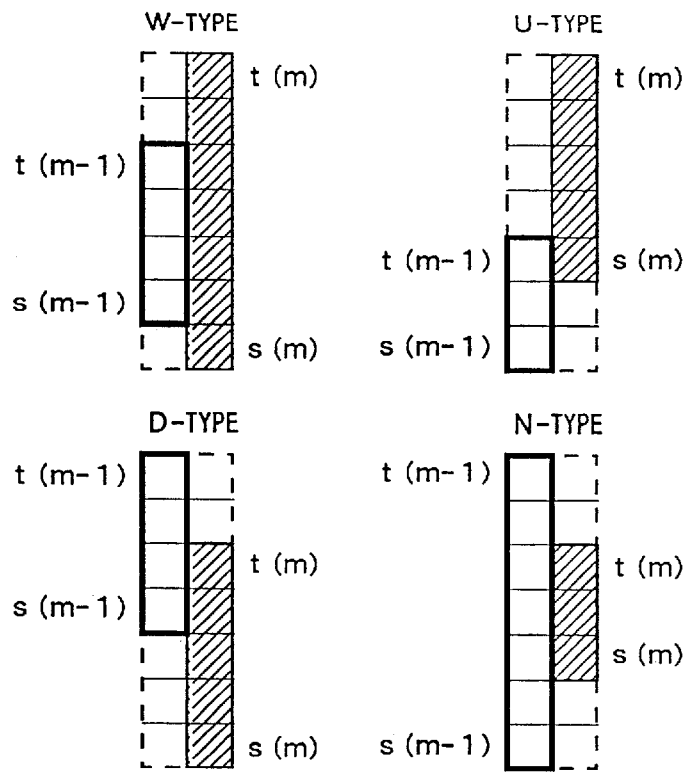
FIG. 28 is a drawing for explaining the nature of the rectilinear convex region.

(a) W-Type: Widen Type (upper-left of FIG. 28) for s(m-1)$\geq$s(m), t(m-1)$\leq$t(m)

(b) U-Type: Up Type (upper-right of FIG. 28) for s(m-1)$\leq$s(m), t(m-1)$\leq$t(m)

(c) D-Type: Down Type (lower-left of FIG. 28) for s(m-1)$\geq$s(m), t(m-1)$\geq$t(m)

(d) N-Type: Narrow Type (lower-right of FIG. 28) for s(m-1)$\leq$s(m), t(m-1)$\geq$t(m)

A column of $m=m_1$ belongs to all the change tendencies, and if the equality signs in the above inequalities are valid, the particular column belongs to a plurality of change tendencies at the same time. From the above definition, the section of any column in a rectilinear convex region belongs to any of the above four types.

Further, from the nature of the rectilinear convex region, the change tendency of the left adjacent column of a column having a certain change tendency satisfies the following conditions. That is, (1) The left adjacent column of W-Type is W-Type.

(2) The left adjacent column of U-Type is W-Type or U-Type.

(3) The left adjacent column of D-Type is W-Type or D-Type.

(4) The left adjacent column of N-Type is W-Type or U-Type, or D-Type, or N-Type.

Figure 29:
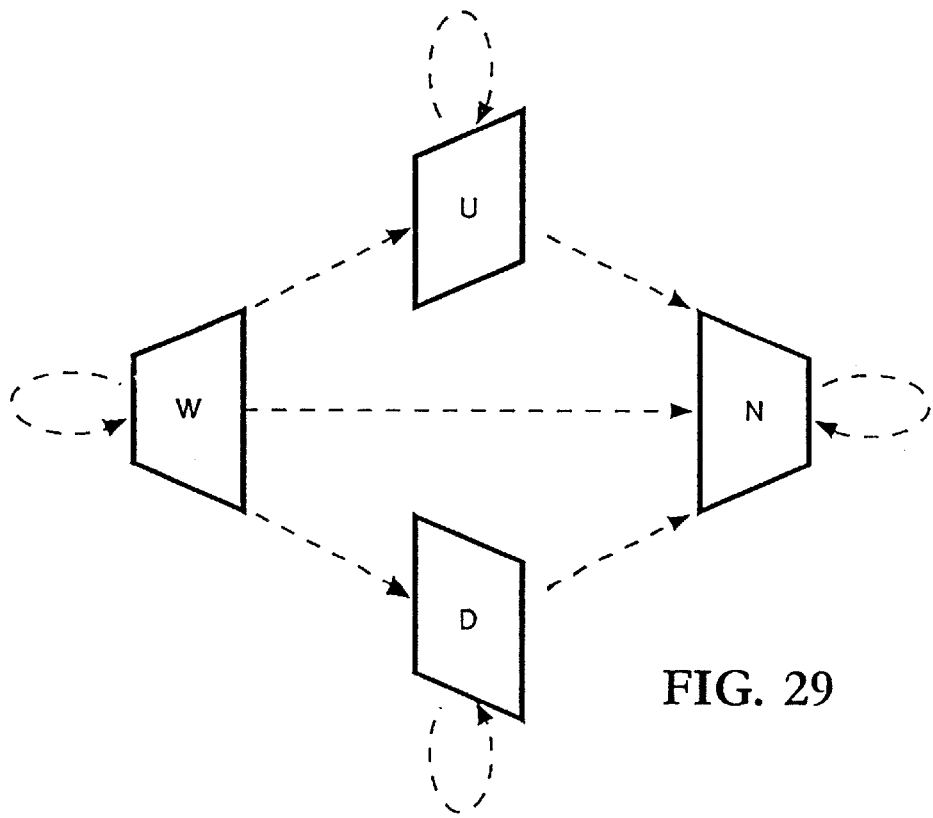
FIG. 29 is a drawing for representing state transition in each column.

Conversely, regions satisfying such conditions are rectilinear convex regions. These conditions are shown in FIG. 29 as a state transition diagram. W, U, D, and N in the figure are W-Type, U-Type, D-Type, and N-Type, respectively, and each tracing of an arrow means transition to the state of one right adjacent column.

All rectilinear convex regions can be classified into the above shown four types by the change tendency of the rightmost column of the region. The four types are generically called X-type (X$\in$\{W, U, D, N\}). Similarly to the type of the section of a column, the type of a region may belong to a plurality of types at the same time.

Further, the maximum value of the gains of rectilinear convex regions of the X-type whose right end is the section [s, t] in the m-th column is represented as $f_m^X(s, t)$. And, the largest gain of the four types' regions is represented as $f_m(s, t)$. That is, it is $$f_m(s,t) = \max\{f_m^W(s,t), f_m^U(s,t), f_m^D(s,t), f_m^N(s,t)\} \quad \text{[Expression 20]}$$

These $f_m(s, t)$ are determined for $m=0, \ldots N_x-1$ ($\forall(s \leq t)$), and the largest of them is selected, then it is the maximum value of the gains of the all rectilinear convex regions on the above plane.

To determine the maximum value, a course of sequentially calculating all $f_m(s, t)$ ($\forall(s \leq t)$) for $m=0 \ldots N_x-1$ is taken.

Then, for m=0, that is, $f_0^X(s, t)$ of the first column is calculated. In this case, it is the same for all the types. This is obtained by $$f_0^X(s, t) = \Gamma_0(s, t) \qquad \text{[Expression 21]}$$
$$\forall X \in \{W, U, D, N\}$$
$$\forall (s \leq t)$$

Then, $f_{m-1}^X(s, t)$ ($\forall(X \in \{W, U, D, N\}, (\forall(s \leq t)))$ is determined. The following gives description for each type.

(a) Widen Type (W-Type)

The maximum value $f_m^W(s, t)$ of the gains of rectilinear convex regions in which the section [s, t] in the m-th column is the rightmost end and the m-th column is W-Type is determined by the following expression.

$$f_m^W(s, t) = \max \begin{cases} \Gamma_m(s, t) & (1) \\ f_{m-1}^W(s, t) + \Gamma_m(s, t) & (2) \\ f_m^W(s, t-1) + g(t, m) & (s < t) \quad (3) \\ f_m^W(s+1, t) + g(s, m) & (s < t) \quad (4) \end{cases} \quad \text{[Expression 22]}$$

To obtain max, comparison is made only for the expressions (1) and (2) of the equation 22 if s=t, and the larger value is used. For other cases, the largest value from all of (1) to (4) is used.

The expression (1) in the equation 22 represents the gain of a region (vertical rectangle of a width 1) consisting only of the section [s, t] of the m-th column. Further, the expression (2) represents the largest gain of the regions in which the m-1-th column is W-Type and its section is [s, t], and the m-th column is the right end at the section [s, t]. This indicates the case as shown in FIG. 30(a). In addition, from the nature of the rectilinear convex region, if the m-th column is W-type, it is determined that the m-1-th column is W-Type.

Further, the expression (3) represents the largest gain of the regions in which the m-1-th column is W-Type and its section [s(m-1), t(m-1)] satisfies s(m-1)$\geq$s, t(m-1)$\leq$t-1, and the section [s, t] of the m-th column is the right end. This means the shape as shown in FIG. 30(b). The upper end of the m-1-th column is not greater than t-1, and the lower end is not smaller than s. The expression (4) represents the largest gain of the regions in which the m-1-th column is W-Type and its section [s(m-1), t(m-1)] satisfies s(m-1)$\geq$s+1, t(m-1)$\leq$t, and the section [s, t] of the m-th column is the right end. This means the shape as shown in FIG. 30(c). The upper end of the m-1-th column is not greater than t, and the lower end is not smaller than S+1. The expressions (2) to (4) take into consideration that the left column adjacent to W-Type cannot be any other type than W-Type.

The above calculation of $f_m^W(s, t)$ is performed for all the sections [s, t] in one column. This calculation follows the algorithm in FIG. 31. As described above, the largest gain is obtained of the regions in which the m-th column is the right end of the region and the change tendency from the m-1-th column is W-Type.

(b) Up Type (U-type)

First, the values of the following expressions are determined.

$$\beta_{m-1}^{W}(s, t) = \left\{ i \,\middle|\, \max_{i \leq s} f_{m-1}^{W}(i, t) \right\} \quad \text{[Expression 23]}$$

$$\beta_{m-1}^{U}(s, t) = \left\{ i \,\middle|\, \max_{i \leq s} f_{m-1}^{U}(i, t) \right\} \quad \text{[Expression 24]}$$

Figures 30, 31, 32:
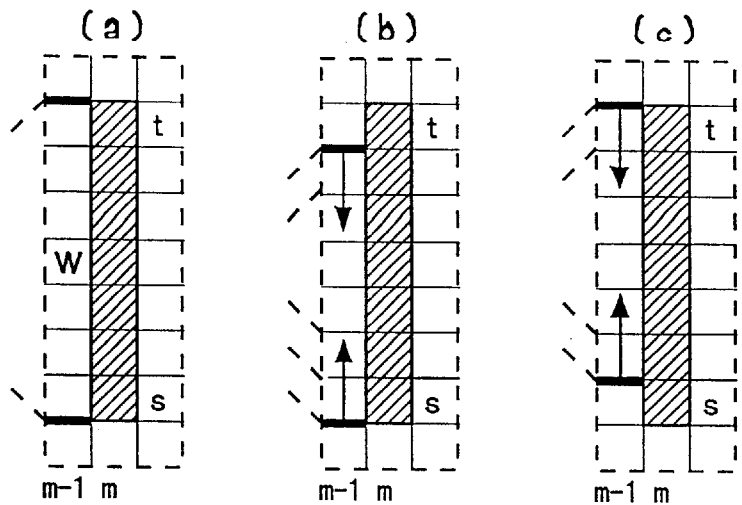
FIG. 30 is a drawing for explaining the relationship between the m-th column and the m−1-th column in W-type. (a) is for explaining an expression (2) in the Expression 22, (b) for explaining an expression (3), (c) for explaining an expression (4)
FIG. 31 is a pseudo-code for explaining the calculation order of $f_m^W(m,t)$.
FIG. 32 is a pseudo-code for explaining an preprocessing algorithm for the calculation of U-type.

This is executed by an algorithm as shown in FIG. 32.

Using the above calculation, the maximum value $f_m^U(s, t)$ of the gains of the rectilinear convex regions in which the section [s, t] of the m-th column is the rightmost end and the m-th column is U-type is obtained from the following expression.

$$f_m^U(s, t) = \max \begin{cases} \Gamma_m(s, t) & (1) \\ f_{m-1}^{W}(\beta_{m-1}^{W}(s, t), t) + \Gamma_m & (s, t) \quad (2) \\ f_{m-1}^{U}(\beta_{m-1}^{U}(s, t), t) + \Gamma_m & (s, t) \quad (3) \\ f_m^U(s, t-1) + g(t, m) & (s < t) \quad (4) \end{cases} \quad \text{[Expression 25]}$$

The expressions (1) to (3) are used for comparison if s=t, and the expression (4) is not used in such case.

Figures 33, 34, 35:
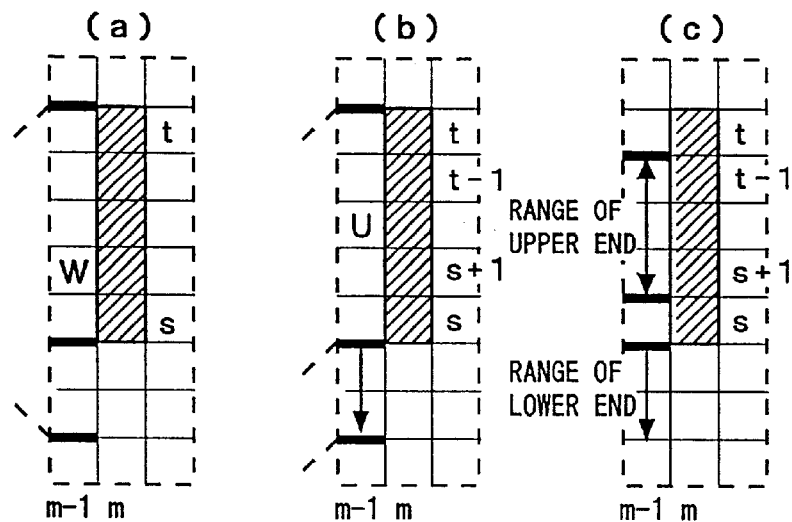
FIG. 33 is a drawing for explaining the relationship between the m-th column and the m−1-th column in U-type. (a) is for explaining an expression (2) in the Expression 25, (b) for explaining an expression (3), (c) for explaining an expression (4)
FIG. 34 is a pseudo-code for explaining the calculation order of $f_m^U(m,t)$.
FIG. 35 is a pseudo-code for explaining an preprocessing algorithm for the calculation of D-type.

The expression (1) of the Expression 25 represents the gain of a region (vertical rectangle of a width 1) consisting only of the section [s, t] of the m-th column. Further, the expression (2) represents the largest gain of the regions in which the m−1-th column is W-Type and its section [s(m−1), t(m−1)] satisfies s(m−1)≦s, t(m−1)=t, and the m-th column is the right end at the section [s, t]. This is for the shape shown in FIG. 33(a), and the upper limit of the lower end of the m−1-th column is s.

The expression (3) represents the largest gain of the regions in which the m−1-th column is U-Type and its section [s(m−1), t(m−1)] satisfies s(m−1)≦s, t(m−1)=t, and the m-th column is the right end at the section [s, t]. This is for the shape shown in FIG. 33(b), and the upper limit of the lower end of the m−1-th column is S. The expression (4) represents the largest gain of the regions in which the m−1-th column is W-Type or U-Type and its section [s(m−1), t(m−1)] satisfies s(m−1)≦s, s≦t(m−1)≦t−1, and the m-th column is the right end at the section [s, t]. This is for the shape shown in FIG. 33(c), and the upper limit of the lower end of the m−1-th column is s, and the range of the upper end is not smaller than s and not greater than t−1. The expressions (2) to (4) take into consideration that the left adjacent column to U-Type cannot be any other type than W-Type or U-Type.

The above calculation of $f_m^U(s, t)$ is performed for all the sections [s, t] in one column. This calculation follows the algorithm shown in FIG. 34. Thus, the largest gain is obtained of the regions in which the m-th column is the right end of the region and the change tendency thereof is U-Type.

(c) Down Type (D-Type)

First, the values of the following expressions are calculated.

$$\tau_{m-1}^{W}(s, t) = \left\{ i \,\middle|\, \max_{i \geq t} f_{m-1}^{W}(s, i) \right\} \quad \text{[Expression 26]}$$

$$\tau_{m-1}^{D}(s, t) = \left\{ i \,\middle|\, \max_{i \geq t} f_{m-1}^{D}(s, i) \right\} \quad \text{[Expression 27]}$$

Figures 36, 37:
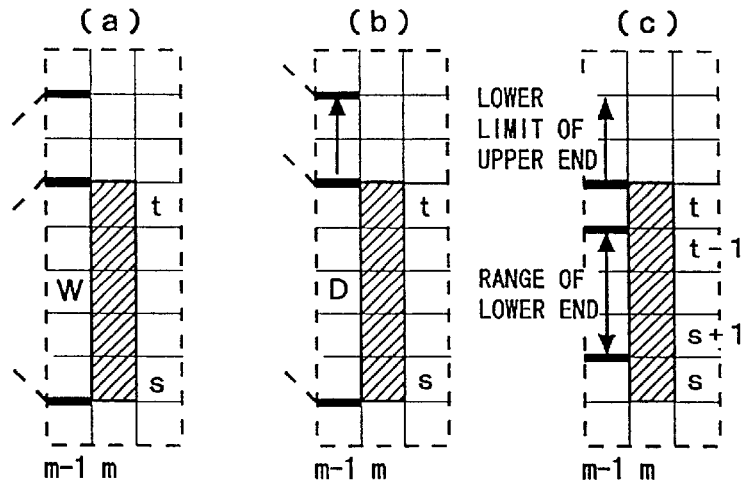
FIG. 36 is a drawing for explaining the relationship between the m-th column and the m−1-th column in D-type. (a) is for explaining an expression (2) in the Expression 28, (b) for explaining an expression (3), (c) for explaining an expression (4)
FIG. 37 is a pseudo-code for explaining the calculation order of $f_m^D(m,t)$.

These calculations are carried out by the algorithm shown in FIG. 36. The expressions (1) to (3) are used for comparison if s=t, and the expression (4) is not used in such case.

Using the above calculations, the maximum value $f_m^D(s, t)$ of the gains of the rectilinear convex regions in which the section [s, t] of the m-th column is the rightmost end and the m-th column is D-Type is determined from the following expression.

$$f_m^D(s, t) = \max \begin{cases} \Gamma_m(s, t) & (1) \\ f_{m-1}^{W}(s, \tau_{m-1}^{W}(s, t)) + \Gamma_m & (s, t) \quad (2) \\ f_{m-1}^{D}(s, \tau_{m-1}^{D}(s, t)) + \Gamma_m & (s, t) \quad (3) \\ f_m^D(s+1, t) + g(s, m) & (s < t) \quad (4) \end{cases} \quad \text{[Expression 28]}$$

The expression (1) of the Expression 28 represents the gain of a region (vertical rectangle of a width 1) consisting only of the section [s, t] of the m-th column. Further, the expression (2) 15 represents the largest gain of the regions in which the m−1-th column is W-Type and its section [s(m−1), t(m−1)] satisfies s(m−1)=s, t(m−1)≧t, and the m-th column is the right end at the section [s, t]. This is for the shape shown in FIG. 37(a), and the lower limit of the upper end of the m−1-th column is t.

The expression (3) represents the largest gain of the regions in which the m−1-th column is D-Type and its section [s(m−1), t(m−1)] satisfies s(m−1)=s and t(m−1)≧t, and the m-th column is the right end at the section [s, t]. This is for the shape shown in FIG. 37(b), and the lower limit of the upper end of the m−1-th column is t. The expression (4) represents the largest gain of the regions in which the m−1-th column is W-Type or D-Type and its section [s(m−1), t(m−1)] satisfies s+1≦s(m−1)≦t and t(m−1)≧t, and the m-th column is the right end at the section [s, t]. This is for the shape shown in FIG. 37(c), and the lower limit of the upper end of the m−1-th column is t, and the range of the lower end is not smaller than s+1 and not greater than t. The expressions (2) to (4) take into consideration that the left adjacent column to D-Type cannot be any other type than W-Type or D-Type.

The above calculation of $f_m^D(s, t)$ is performed for all the sections [s, t] in one column. This calculation follows the algorithm in FIG. 35. Thus, the largest gain is obtained of the regions in which the m-th column is the right end of the region and the change tendency thereof is D-Type.

(d) Narrow Type (N-Type)

The following expression gives the maximum value $f_m^N(s, t)$ of the gains of the rectilinear convex regions in which the section [s, t] of the m-th column is the rightmost end and the m-th column is N-Type.

$$f_m^N(s, t) = \max \begin{cases} \Gamma_m(s, t) & (1) \\ f_{m-1}^W(s, t) + \Gamma_m(s, t) & (2) \\ f_{m-1}^U(s, t) + \Gamma_m(s, t) & (3) \\ f_{m-1}^D(s, t) + \Gamma_m(s, t) & (4) \\ f_m^N(s, t+1) + \Gamma_m(s, t) & (5) \\ f_m^N(s, t+1) - g(t+1, m) & (t < N_y - 1) \quad (6) \\ f_m^N(s-1, t) - g(s-1, m) & (s > 0) \quad (7) \end{cases}$$ [Expression 29]

When max is determined, each expression is used only if the condition at the end of the expression is satisfied. That is, the expression (6) is compared only when $t > N_y - 1$ is satisfied, and the expression (7) is used for comparison only if $s > 0$ is satisfied.

Figures 38, 39:
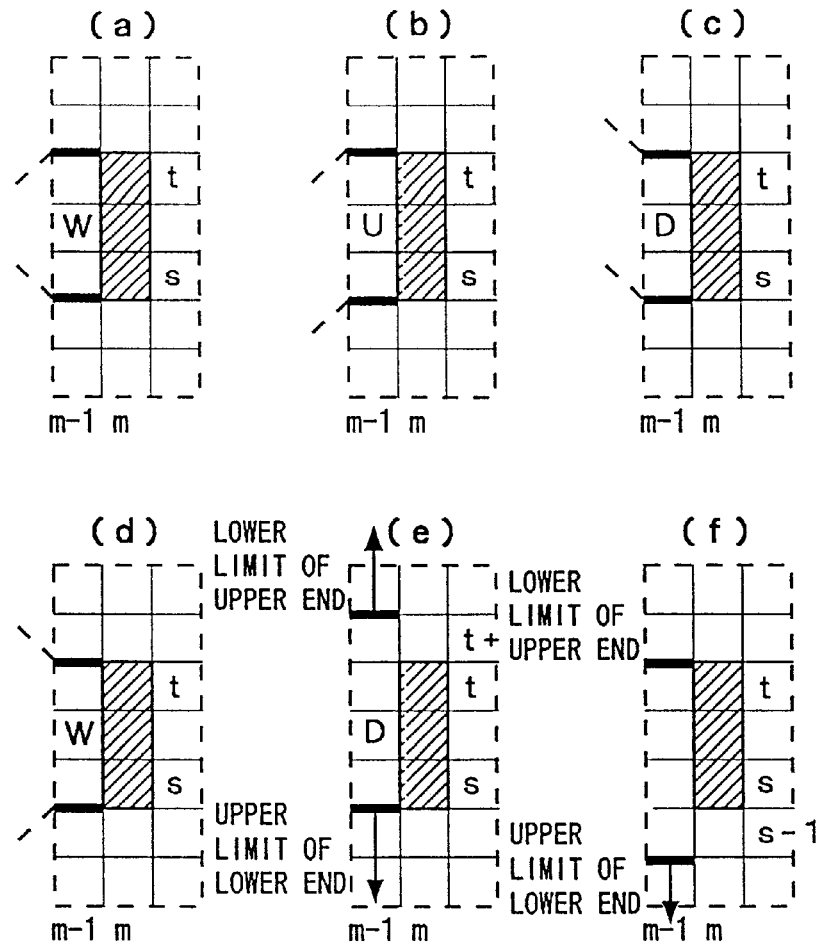
FIG. 38 is a drawing for explaining the relationship between the m-th column and the m−1-th column in N-type. (a) is for explaining an expression (2) in the Expression 29, (b) for explaining an expression (3), (c) for explaining an expression (4), (d) for explaining an expression (5), (e) for explaining an expression (6), (f) for explaining an expression (7)
FIG. 39 is a pseudo-code for explaining the calculation order of $f_m^N(m,t)$.

The expression (1) of the Expression 29 represents the gain of a region (vertical rectangle of a width 1) consisting only of the section [s, t] of the m-th column. The expression (2) represents the largest gain of the regions in which the m−1-th column is W-Type and its section is [s, t], and the m-th column is the right end at the section [s, t]. This is for the shape shown in FIG. 38(a). The expression (3) represents the largest gain of the regions in which the section [s, t] of the m−1-th column is U-Type, and the m-th column is the right end at the section [s, t]. This is for the shape shown in FIG. 38(b). The expression (4) represents the largest gain of the regions in which the section [s, t] of the m−1-th column is D-Type, and the m-th column is the right end at the section [s, t]. This is for the shape shown in FIG. 38(c). The expression (5) represents the largest gain of the regions in which the section [s, t] of the m−1-th column is N-Type and its section is [s, t], and the m-th column is the right end at the section [s, t]. This is for the shape shown in FIG. 38(d).

Expression (6) represents the largest gain of the regions in which the m−1-th column is W-Type, U-Type, D-Type, or N-Type and its section [s(m−1), t(m−1)] satisfies s(m−1)≦s and t(m−1)≧t+1, and the m-th column is the right end at the section [s, t]. This is for the shape shown in FIG. 38(e), and the lower limit of the upper end of the m−1-th column is t+1, and the upper limit of the a lower end is s. The expression (7) represents the largest gain of the regions in which the m−1-th column is W-Type, U-Type, D-Type, or N-Type and its section [s(m−1), t(m−1)] satisfies s(m−1)≦s−1 and t(m−1)≧t, and the m-th column is the right end at the section [s, t]. This is for the shape shown in FIG. 38(f), and the lower limit of the upper end of the m−1-th column is t, and the upper limit of the lower end is s−1.

The above calculation of $f_m^N(s, t)$ is performed for all the sections [s, t] in one column. This calculation follows the algorithm in FIG. 39. Thus, the largest gain is obtained of the regions in which the section [s, t] of the m-th column is the right end of the region and the change tendency thereof is N-Type.

By the above described calculations (a) to (d), the largest gain of the regions in which the each [s, t] of each column is the right end can be calculated, but the "region" itself needs to be stored at the same time. This is because the data included in the obtained rectilinear convex region is taken out in the later output step.

If there are a plurality of regions having the same maximum value, the one which was found first is treated as the solution. Further, the regions are expressed as [s(m₁), t(m₁)], ... [s(m_r), t(m_r)], which shows that vertical sections are laterally arranged. Since one column includes $N_y$ rows, the total number of sections [s, t] (s≦t) is $N_y(N_y+1)/2$. Each section [s, t] is made to correspond to one integer p in a one-to-one relationship.

For instance, by the following function h(s, t), a section [s, t] can be made to correspond to one integer p=h(s, t). That is, it is $$h(s, t) = S + \frac{t(t+1)}{2}.$$ [Expression 30]

Conversely, from the integer p (0≦p≦$N_y(N_y+1)/2$) representing a section, the section [s, t] is determined as follows.

$$t = \left\lfloor \frac{-1 + \sqrt{1 + 8p}}{2} \right\rfloor$$ [Expression 31]

$$S = P - \frac{t(t+1)}{2}$$ [Expression 32]

However, such calculation is not used for determining which region has the largest gain. Hereinafter, [s, t] is treated as the same as one integer. Further, the above Expression 30 is merely an example, and there is no problem if other functions are used.

Then, arrays in which regions are stored are prepared. They are integer-type two-dimensional arrays of $N_x \times N_y(N_y+1)/2$, which are prepared one for each of the W, U, D, and N-Types. This element is represented by $H^X(m, [s, t])$ (0≦m≦$N_x$−1, 0≦[s, t]≦$N_y(N_y+1)/2$, X∈{W, U, D, N}).

Figure 40:
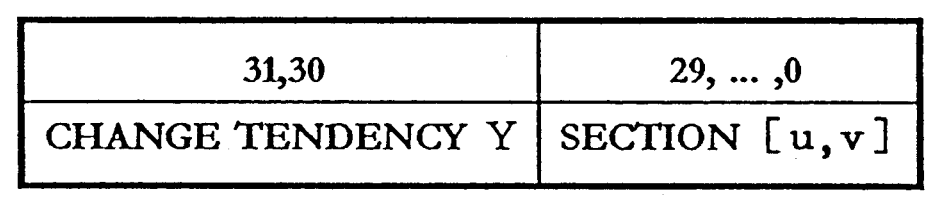

In this element $H^X(m, [s, t])$, the section [x, y] in the m−1-th column of a region whose gain is $f_m^X(s, t)$, and a numeric value representing the change tendency Y of the m−1-th column from the m−2-th column are stored. Hereinafter, it is represented by $H^X(m, [s, t])$=Y:[x, y]. For instance, this $H^X(m, [s, t])$ is expressed by 32 bits of integer type, and the portion of Y is expressed by two upper bits, and the remaining lower bits are used to represent [x, y] (refer to FIG. 40).

However, if the m-th column is the leftmost column, a value representing the left end of the region is stored in the lower bits to show that the m-th column does not connect with the m−1-th column. For instance, in an example in which a section is expressed by the above Expression 32, a value equal to or greater than $N_y(N_y+1)/2$ is placed in the lower bits, or the 29-th bit is used as a flag representing the left end of the region.

Figure 41:
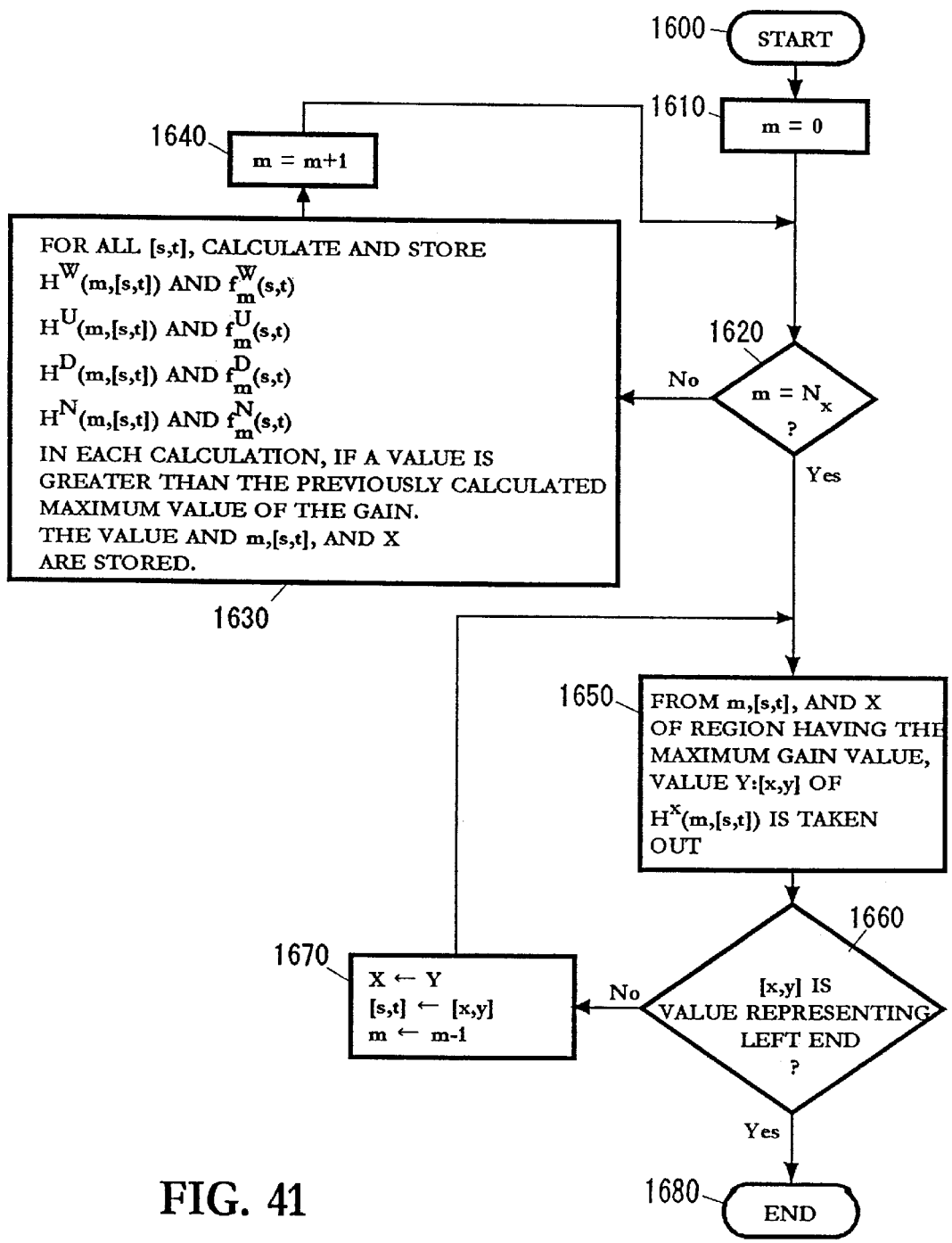
FIG. 41 is a flowchart for segmenting a rectilinear convex region.

Now, the process for finally determining a rectilinear convex region having the largest gain is described using FIG. 41. The process started at step 1600 initializes m by m=0 (step 1610). Then, it is determined whether m=$N_x$ (step 1620). This is to determine whether m has reached $N_x$ and the following calculation has been completed for all the columns. If the calculation has not been completed for all the columns m, $H^W(m, [s, t])$ and $f_m^W(s, t)$, $H^U(m, [s, t])$ and $f_m^U(s, t)$, $H^D(m, [s, t])$ and $f_m^D(s, t)$, and $H^N(m, [s, t])$ and $f_m^N(s, t)$ are calculated for all [s, t], and the result is stored. The sequence of this calculation is arbitrary. Then, if, during each calculation, a value greater than the maximum value of the previously calculated gains is calculated, that value and its m, [s, t], and X are stored (step 1630).

The calculation of $H^W(m, [s, t])$ and $f_m^W(s, t)$ can be provided by carrying out the calculation of the previously shown Expression 22. Accordingly, $H^W(m, [s, t])$ becomes a value representing the left end of the region if the expression (1) of the Expression 22 is maximum, W:[s, t] if the expression (2) is maximum, $H^W(m, [s, t-1])$ if the expression (3) is maximum, and $H^W(m, [s+1, t])$ if the expression (4) is maximum. As described above, if only $H^W(m, [s, t])$ is considered, the preceding m−1-th column is always W-Type, and thus it is not necessary to store the change tendency of the m−1-th column from the m−2-th column.

Further, the calculation of $H^U(m, [s, t])$ and $f_m^U(s, t)$ can be provided by carrying out the calculation of the previously shown Expression 25. Accordingly, in $H^U(m, [s, t])$, a value representing the left end of the region is stored if the expression (1) of the Expression 25 is maximum, W:[$\beta_{m-1}^W$ (s, t), t] if the expression (2) is maximum, U:[$\beta_{m-1}^U(s, t)$, t] if the expression (3) is maximum, and $H^U(m, [s, t-1])$ if the expression (4) is maximum.

The calculation of $H^D(m, [s, t])$ and $f_m^D(s, t)$ can be provided by carrying out the calculation of the previously shown Expression 28. Accordingly, in $H^D(m, [s, t])$, a value representing the left end of the region is stored if the expression (1) of the Expression 28 is maximum, W:[s, $\tau_{m-1}^W(s, t)$] if the expression (2) is maximum, D:[s, $\tau_{m-1}^D(s, t)$] if the expression (3) is maximum, and $H^D(m, [s+1, t])$ if the expression (4) is maximum.

Finally, the calculation of $H^N(m, [s, t])$ and $f_m^N(s, t)$ can be provided by carrying out the calculation of the previously shown Expression 29. Accordingly, in $H^N(m, [s, t])$ a value representing the left end of the region is stored if the expression (1) of the Expression 29 is maximum, W:[s, t] if the expression (2) is maximum, U:[s, t] if the expression (3) is maximum, and D:[s, t] if the expression (4) is maximum, N:[s, t] if the expression (5) is maximum, $H^N(m, [s, t+1])$ if the expression (6) is maximum, and $H^N(m, [s-1, t])$ if the expression (7) is maximum.

As seen from the foregoing, it is not needed to store all $f_m^X(s, t)$. When the calculation of the m-th column is carried out, only the calculation results of the m-th column and the m−1-th column are used. Accordingly, only a storage capacity for two columns is required for each of the W, U, D, and N-Types. However, all $f_m^X(s, t)$ may be stored if there is a sufficient storage.

When step 1630 of FIG. 41 ends, m is incremented by one (step 1640), and the process returns to step 1620. Then, this process is executed for all the columns. If executed for all the columns, from m, [s, t], and X regarding the region having the largest gain value for all the columns, $H^X(m, [s, t])$ is referenced and its value Y:[x, y] is taken out (step 1650). Up to this point, the m-th column that is the rightmost column, the section [s, t] of that column, and the m−1-th column and its section [x, y] have been found.

Then, since the region may be the left end at the m−1-th column, it is determined whether [x, y] is a value representing the left end (step 1660). If it is the left end, the process terminates at this point (step 1680). If it is not the left end, Y is substituted into X, [x, y] into [s, t], and m−1 into m (step 1670), and then the process returns to step 1650. By repeating this process in this way until [x, y] becomes a value representing the left end, the section of each column of the rectilinear convex region having the largest gain value can be obtained.

The interclass variance for the rectilinear convex region (or an evaluation value with respect to another condition) may be calculated after the entire region is determined, or during the calculation of the region.

Appendix C.

If the number of data is small, it is possible to decrease the number of buckets and to find out a region which maximizes the value of Expression 3 exhaustively.

By the algorithms described above, a region R with a desired shape can be segmented from a plane. In addition, a rule R by the region R can be constructed. However, the above explanation is concerned about only upper convex hull on the plane shown in FIG. 7. Therefore, a region on the lower convex hull is calculated by minimizing the expressions shown in Expression 1 and etc. instead of maximizing.

Figure 42:
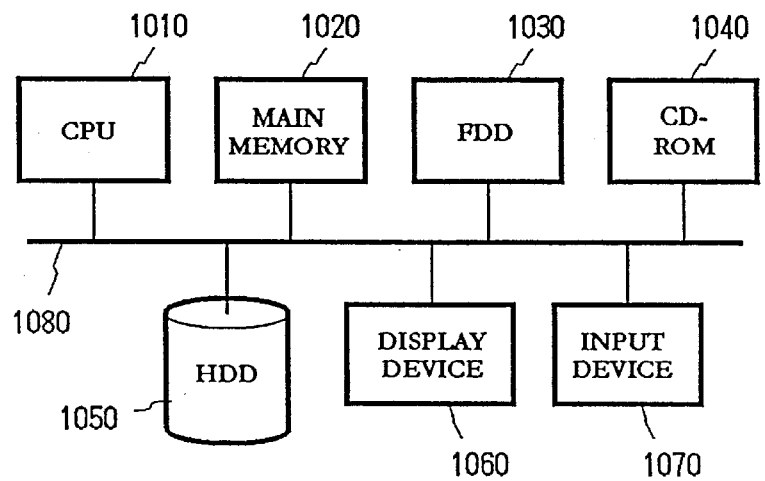
FIG. 42 is a diagram illustrating an example configuration of an ordinary computer system implementing the present invention.

The processing of the present invention has been explained. This processing may be realized by a computer program. For example, the processing can be included in a program that can be executed by an ordinary computer system shown in FIG. 42. The processing program is stored on an HDD 1050, and is loaded into a main memory 1020, and is then executed by a CPU 1010. A database is also stored on the HDD 1050, and the processing program accesses the database. The plane in FIG. 5, the region R extracted therefrom, and the regression tree or the decision tree are provided for a user by a display device 1060. The user uses an input device 1070 to enter a tree generation command, a condition input command or a data output command. The input device 1070 can be a keyboard, a mouse, a pointing device or a digitizer. The output result can be stored on a floppy disk in an FDD 1030, which is an auxiliary storage device, or new data can be read from the FDD 1030. Additional data can be input by using a CD-ROM drive 1040.

A computer program that realizes the processing of the present invention can be stored on a storage medium, such as a floppy disk or a CD-ROM, and be transported. In this case, a data extraction portion of an ordinary database search program, or a program for displaying data on the display device 1060, may already be stored on the HDD 1050. It is, therefore, normal for the other portions to be distributed on one of the above mentioned storage mediums. A communication device (not shown) may be connected to a bus 1080, so that a database at a remote location can be accessed for processing or so that a result obtained by processing can be transmitted to a remote location.

Figure 43:
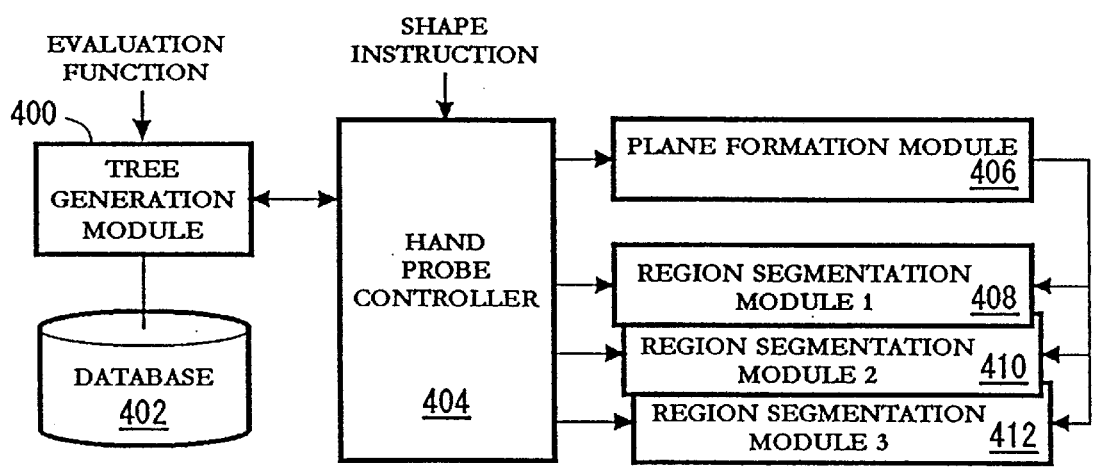
FIG. 43 is a block diagram illustrating a special device which performs the present invention.

A special device for executing the processing of the present invention may be provided. An example device is shown in FIG. 43. A tree generation module 400 in this device is connected to a database 402 and a hand probe controller 404. The hand probe controller 404 is connected to a plane formation module 406 and region segmentation modules 1 to 3 (408, 410 and 412). The plane formation module 406 is connected to a region segmentation modules 1 to 3.

The tree generation module 400 executes the whole of processings necessary for constructing the regression tree or the decision tree. Necessary data is read out from the database 402, and the data is output to the hand probe controller 404. Furthermore, the designation of the conditions such as the evaluation function from a user is also received. For example, the foregoing evaluation function for maximizing the interclass variance, the GINI index function and the like is designated. The hand probe controller 404 executes setting of the θ necessary for the hand probe. Moreover, the shape which the user attempts to segment is designated by the shape destination. Here, the x monotone region, the base monotone region and the rectilinear convex region can be selected. The region segmentation module 1 is in charge of the x monotone region, the region segmentation module 2 is in charge of the base monotone region, and the region segmentation module 3 is in charge of the rectilinear convex region. The hand probe controller 404 designates the region segmentation module to be activated. The plane formation module 406 constitutes the plane shown in FIG.

5 using the data from the hand probe controller 404, and outputs it to each region segmentation module.

The above described constitution is just one example, and the division of the modules as shown in FIG. 43 is not necessarily required. The module executing the foregoing processing can be divided or integrated as required.

It was enabled to segment a region having the smooth boundary from the plane mapped by two axes corresponding to the two predicative numeric attributes of data, to utilize the region for the prediction of the objective attribute of data.

Moreover, nodes of the decision tree or the regression tree can be generated by the segmented region. Experiment results are shown below. Table 1 shows the case where the x monotone region segmentation algorithm was used, and Table 2 shows the case where the rectilinear convex region segmentation algorithm was used. In each table, the error Err and the size Size (the number of terminal nodes in the tree) are shown, when the region is segmented at a bucket unit, when the spline curve of FIG. 11 is used, and when the spline curve of FIG. 12 is used, respectively. The error Err is a normalized value by dispersion of values for predicting a mean-squared error between the predicted value and an actual value. By considering this, it is found that the error Err becomes small with the use of the curve of FIG. 12. Therefore, the precision of the prediction could be enhanced.

DESCRIPTION OF THE SYMBOLS

1010: CPU
1020: Main memory
1030: FDD
1040: CD-ROM drive
1050: HDD
1060: Display device
1070: Input device
400: Tree generation module
402: Database
404: Hand probe controller
406: Plane formation module
408: Region segmentation module 1
410: Region segmentation module 2
412: Region segmentation module 3

I claim:

1. A method for determining a rule associated with an objective attribute of data in a database to predict the objective attribute value of data, said method comprising the steps of:

storing values relative to data belonging to each bucket, said values corresponding to each said bucket in a plane, wherein said plane has two axes respectively corresponding to two predicative numeric attributes of data and is divided into N×M buckets;

segmenting a bucket region that is satisfied with a predetermined condition, from said plane;

performing a smoothing processing for a boundary of the segmented bucket region; and determining a rule for predicting the object attribute value of said data by the smoothed region.

2. The method set forth in claim 1, wherein said values relative to data belonging to a bucket are the number of data belonging to each bucket and values relative to said objective attribute of data belonging to a bucket.

3. The method set forth in claim 2, wherein said objective attribute is a numeric attribute, and said value relative to said objective attribute is the sum of values of said objective attribute of data belonging to a bucket.

4. The method set forth in claim 2, wherein said objective attribute is a true-false attribute, and said value relative to said objective attribute is the number of data whose objective attribute value is true and belongs to a bucket.

5. The method set forth in claim 1, wherein said predetermined condition is to maximize an interclass variance.

6. The method set forth in claim 1, wherein said predetermined condition is to maximize an entropy gain of discrete values of said objective attribute.

7. The method set forth in claim 1, wherein said predetermined condition is to maximize a GINI index function value of discrete values of said objective attribute.

8. The method set forth in claim 1, wherein said predetermined condition is to maximize a $\chi$ square value of discrete values of said objective attribute.

9. The method set forth in claim 1, wherein said objective attribute is a true-false attribute, and said predetermined condition is to maximize the number of included data when a ratio of data whose objective attribute value is true is more than a predetermined value, or to maximize a ratio of data whose objective attribute value is true when the minimum number of included data is defined.

10. The method set forth in claim 1, wherein said smoothing processing is a processing to make a boundary of said region a spline curve.

11. The method set forth in claim 1, wherein said smoothing processing comprises a step of defining control points in sides of N stripes in said region, wherein said stripes are parallel to an axis corresponding to a first predicative numeric attribute, and said sides are parallel to an axis corresponding to a second predicative numeric attribute.

12. The method set forth in claim 11, wherein said smoothing processing further comprises a step of setting a curve passing said control points.

13. The method set forth in claim 1, wherein said determining step comprises a step of generating a tree in which a node relative to data within the smoothed region and a node relative to data outside of the smoothed region are added.

14. An apparatus for determining a rule associated with an objective attribute of data in a database to predict the objective attribute value of data, comprising:

means for storing values relative to data belonging to each bucket, said values corresponding to each said bucket in a plane, wherein said plane has two axes respectively corresponding to two predicative numeric attributes of data and is divided into N×M buckets;

means for segmenting a bucket region that is satisfied with a predetermined condition, from said plane;

means for performing a smoothing processing for a boundary of the segmented bucket region; and means for determining a rule for predicting the object attribute value of said data by the smoothed region.

15. An apparatus for determining a rule associated with an objective attribute of data in a database to predict the objective attribute value of data, said apparatus comprising:

a means for storing values relative to data belonging to each bucket, said values corresponding to each said bucket in a plane, wherein said plane has two axes respectively corresponding to two predicative numeric attributes of data and is divided into N×M buckets;

a means for segmenting a bucket region that is satisfied with a predetermined condition, from said plane;

a means for performing a smoothing processing for a boundary of the segmented bucket region; and a means for determining a rule for predicting the object attribute value of said data by the smoothed region.

16. A storage medium for storing a program for causing a computer to determine a rule associated with an objective attribute of data in a database to predict the objective attribute value of data, said program comprising the steps of:

storing values relative to data belonging to each bucket, said values corresponding to each said bucket in a plane, wherein said plane has two axes respectively corresponding to two predicative numeric attributes of data and is divided into N×M buckets;

segmenting a bucket region that is satisfied with a predetermined condition, from said plane;

performing a smoothing processing for a boundary of the segmented bucket region; and determining a rule for predicting the object attribute value of said data by the smoothed region.

17. The storage medium set forth in claim 16, wherein said values relative to data belonging to a bucket are the number of data belonging to each bucket and values relative to said objective attribute of data belonging to a bucket.

18. The storage medium set forth in claim 16, wherein said smoothing processing is a processing to make a boundary of said region a spline curve.

19. The storage medium set forth in claim 16, wherein said determining step comprises a step of generating a tree in which a node relative to data within the smoothed region and a node relative to data outside of the smoothed region are added.

* * * * *